(12) United States Patent
Tanaka et al.

(10) Patent No.: US 12,304,224 B2
(45) Date of Patent: May 20, 2025

(54) IMAGE FORMING APPARATUS

(71) Applicant: CANON KABUSHIKI KAISHA, Tokyo (JP)

(72) Inventors: Yoshihiko Tanaka, Mishima (JP);
Mitsuhiro Ohta, Yokohama (JP);
Takatoshi Tanaka, Atami (JP);
Fumihiko Yamaya, Mishima (JP);
Naoki Matsushita, Suntou-gun (JP);
Hiroki Katayama, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/485,896

(22) Filed: Oct. 12, 2023

(65) Prior Publication Data

US 2024/0034073 A1    Feb. 1, 2024

Related U.S. Application Data

(62) Division of application No. 16/654,429, filed on Oct. 16, 2019, now Pat. No. 11,820,158.

(30) Foreign Application Priority Data

Oct. 19, 2018  (JP) .................. 2018-197220
Oct. 19, 2018  (JP) .................. 2018-197221

(51) Int. Cl.
*B41J 2/44*   (2006.01)
*B41J 2/45*   (2006.01)
(Continued)

(52) U.S. Cl.
CPC .............. *B41J 2/471* (2013.01); *B41J 2/442* (2013.01); *B41J 2/45* (2013.01); *B41J 2/455* (2013.01);
(Continued)

(58) Field of Classification Search
CPC ..... B41J 2/44; B41J 2/442; B41J 2/447; B41J 2/45; B41J 2/455; B41J 2/47; B41J 2/471;
(Continued)

(56) References Cited

U.S. PATENT DOCUMENTS 5,838,001 A     11/1998  Minakuchi et al. ......... 250/236
6,084,622 A *    7/2000  Sugiura .............. G03G 21/1853
                                              347/170

(Continued)

FOREIGN PATENT DOCUMENTS

JP     H05-167793      7/1993
JP     H09-211370      8/1997
(Continued)

OTHER PUBLICATIONS

Office Action dated Aug. 2, 2022 in counterpart Japanese Application No. 2018-197220, together with English translation thereof.
(Continued)

*Primary Examiner* — Justin Seo
*Assistant Examiner* — Kendrick X Liu
(74) *Attorney, Agent, or Firm* — Venable LLP

(57) ABSTRACT

An image forming apparatus includes a photosensitive member and a scanning unit including a light source, a rotatable polygonal mirror, and a sensor. The image forming apparatus includes setting of an operation in a first mode and setting of an operation in a second mode. The image forming apparatus further comprises, a surface identifying portion and a correction data storing portion configured to prestore correction data including first correction data for a first rotational speed and second correction data for a second rotational speed. Positional deviation in a main scan direction of laser light is corrected on the basis of the first correction data or the second correction data.

4 Claims, 25 Drawing Sheets

(51) Int. Cl.
*B41J 2/455* (2006.01)
*B41J 2/47* (2006.01)
*G02B 26/08* (2006.01)
*G02B 26/12* (2006.01)
*G03G 15/04* (2006.01)

(52) U.S. Cl.
CPC ....... *G02B 26/0816* (2013.01); *G02B 26/122* (2013.01); *G02B 26/127* (2013.01); *G03G 15/04* (2013.01)

(58) Field of Classification Search
CPC .. G02B 26/0816; G02B 26/12; G02B 26/121; G02B 26/122; G02B 26/127
See application file for complete search history.

(56) References Cited

U.S. PATENT DOCUMENTS

| | | | |
|---|---|---|---|
| 6,437,817 B1 | 8/2002 | Ohta et al. | 347/254 |
| 6,856,338 B2 | 2/2005 | Takahashi et al. | 347/225 |
| 6,969,846 B2 | 11/2005 | Tanaka et al. | 250/239 |
| 7,118,233 B2 | 10/2006 | Mori | 359/855 |
| 9,128,291 B2 | 9/2015 | Nagatoshi et al. | G03G 21/1666 |
| 9,411,157 B2 | 8/2016 | Ohta et al. | G02B 7/182 |
| 9,523,851 B2 | 12/2016 | Nakamura et al. | G02B 26/121 |
| 9,581,929 B2 | 2/2017 | Nagatoshi et al. | G03G 21/1666 |
| 9,851,558 B2 | 12/2017 | Hayakawa et al. | G02B 7/1821 |
| 9,854,120 B2 | 12/2017 | Tanaka et al. | H04N 1/00519 |
| 9,857,721 B2 | 1/2018 | Yamaya et al. | G03G 15/0409 |
| 9,977,237 B2 | 5/2018 | Ohta et al. | G02B 7/182 |
| 2004/0125199 A1* | 7/2004 | Omori | G03G 15/305 347/234 |
| 2006/0039058 A1 | 2/2006 | Mori | 359/216.1 |
| 2007/0146852 A1 | 6/2007 | Itami | G02B 26/08 |
| 2008/0151334 A1 | 6/2008 | Koga | 358/505 |
| 2011/0285804 A1 | 11/2011 | Esumi | 347/224 |
| 2012/0050443 A1 | 3/2012 | Lim | 347/118 |
| 2013/0222508 A1 | 8/2013 | Ogasahara | G02B 26/08 |
| 2013/0286144 A1 | 10/2013 | Nakahata | 347/224 |
| 2015/0346485 A1 | 12/2015 | Hayakawa et al. | 359/221.2 |
| 2017/0280001 A1* | 9/2017 | Furuta | H04N 1/113 |
| 2017/0299976 A1* | 10/2017 | Mizutani | G02B 26/123 |
| 2017/0329253 A1 | 11/2017 | Tanaka | H04N 1/1135 |
| 2018/0288263 A1 | 10/2018 | Kusuda | H04N 1/028 |
| 2019/0118555 A1 | 4/2019 | Nakai | B41J 2/47 |
| 2019/0152235 A1 | 5/2019 | Yamada | B41J 2/44 |

FOREIGN PATENT DOCUMENTS

| | | |
|---|---|---|
| JP | 2004-102006 | 4/2004 |
| JP | 2004-223840 | 8/2004 |
| JP | 2006-058640 | 3/2006 |
| JP | 2006-251513 | 9/2006 |
| JP | 2007-078723 | 3/2007 |
| JP | 2007-206653 | 8/2007 |
| JP | 2010-069626 | 4/2010 |
| JP | 2010-072325 | 4/2010 |
| JP | 2011-242618 | 12/2011 |
| JP | 2012-083559 | 4/2012 |
| JP | 5041583 B1 | 10/2012 |
| JP | 2013-242536 | 12/2013 |
| JP | 5733897 B1 | 6/2015 |
| JP | 2015-225200 | 12/2015 |
| JP | 2018-008429 | 1/2018 |
| JP | 2019-070755 | 5/2019 |
| WO | WO2018/079336 | 2/2019 |

OTHER PUBLICATIONS

Office Action dated Aug. 2, 2022 in counterpart Japanese Application No. 2018-197221, together with English translation thereof.

* cited by examiner

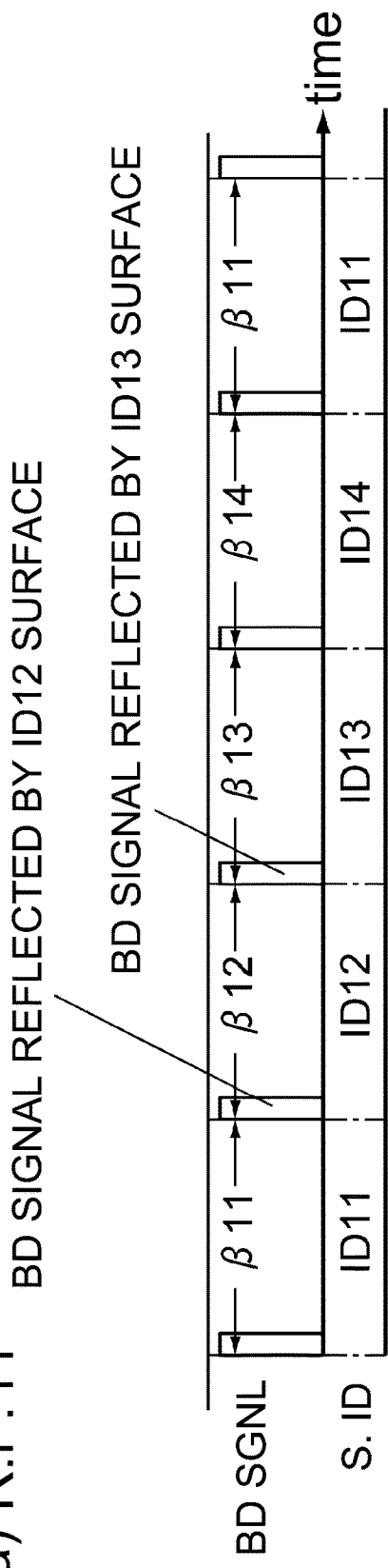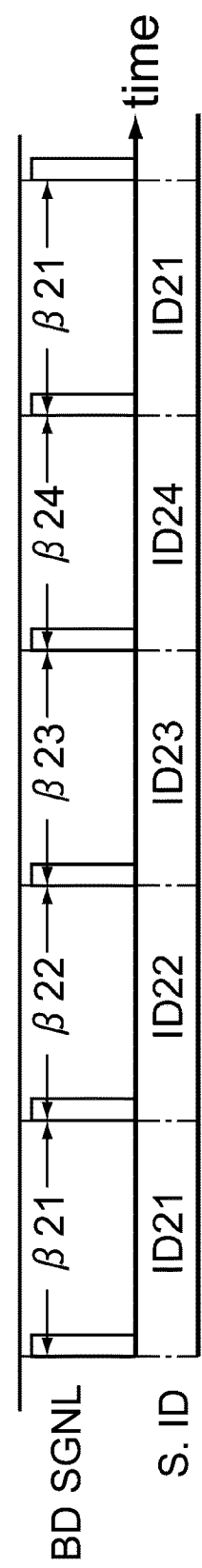
Fig. 4

(a)

CORRECTION DATA STORING PORTION

| R.F. [min⁻¹] | R.S. | BD PRD [μ sec] | CORRECTION DATA [μ m] | | | AD-DRESS |
| --- | --- | --- | --- | --- | --- | --- |
| | | | START | CENTER | END | |
| 25000 | A | 600.676 | 13 | 62 | 111 | adrs11 |
| | B | 600.009 | 13 | 60 | 107 | adrs12 |
| | C | 599.342 | 7 | 28 | 50 | adrs13 |
| | D | 600.009 | 7 | 34 | 61 | adrs14 |
| 39625 | A | 378.966 | 20 | 89 | 158 | adrs21 |
| | B | 378.546 | 20 | 85 | 150 | adrs22 |
| | C | 378.125 | 11 | 46 | 82 | adrs23 |
| | D | 378.546 | 11 | 54 | 96 | adrs24 |

(b)

(a)

CORRECTION DATA STORING PORTION

| R.F. | R.S. | BD PRD [$\mu$ sec] | | CRRCTN DT | AD-DRESS |
|---|---|---|---|---|---|
| r1 | A | $\alpha 11$ | 600.676 | dataL1 | adrs11 |
| | B | $\alpha 12$ | 600.009 | dataL2 | adrs12 |
| | C | $\alpha 13$ | 599.342 | dataL3 | adrs13 |
| | D | $\alpha 14$ | 600.009 | dataL4 | adrs14 |
| r2 | A | $\alpha 21$ | 378.966 | dataH1 | adrs21 |
| | B | $\alpha 22$ | 378.546 | dataH2 | adrs22 |
| | C | $\alpha 23$ | 378.125 | dataH3 | adrs23 |
| | D | $\alpha 24$ | 378.546 | dataH4 | adrs24 |

(b)

SCANNING PERIOD STORING PORTION

| R.F. | S. ID | BD PRD [$\mu$ sec] | |
|---|---|---|---|
| r1 | 1 S. (ID11) | $\beta 11$ | 600.013 |
| | 2 S. (ID12) | $\beta 12$ | 600.678 |
| | 3 S. (ID13) | $\beta 13$ | 600.007 |
| | 4 S. (ID14) | $\beta 14$ | 599.338 |
| r2 | 1 S. (ID21) | $\beta 21$ | 378.544 |
| | 2 S. (ID22) | $\beta 22$ | 378.962 |
| | 3 S. (ID23) | $\beta 23$ | 378.548 |
| | 4 S. (ID24) | $\beta 24$ | 378.127 |

Fig. 6

(a) R.F. = r1, DFFRNC = 4

|  | SCN PRD STRNG PRTN OF S. I. SGNL GNRTR || CRRCTN DT STRNG PRTN |||
|---|---|---|---|---|---|
|  | SURFACE ID | BD PERIOD | AD-DRESS | BD PRD | CRRCTN DATA |
| D S. | ID11 | $\beta 11$ | adrs14 | $\alpha 14$ | dataL4 |
| A S. | ID12 | $\beta 12$ | adrs11 | $\alpha 11$ | dataL1 |
| B S. | ID13 | $\beta 13$ | adrs12 | $\alpha 12$ | dataL2 |
| C S. | ID14 | $\beta 14$ | adrs13 | $\alpha 13$ | dataL3 |

(b) R.F. = r2, DFFRNC = 4

|  | SCN PRD STRNG PRTN OF S. I. SGNL GNRTR || CRRCTN DT STRNG PRTN |||
|---|---|---|---|---|---|
|  | SURFACE ID | BD PERIOD | AD-DRESS | BD PRD | CRRCTN DATA |
| D S. | ID21 | $\beta 21$ | adrs24 | $\alpha 24$ | dataH4 |
| A S. | ID22 | $\beta 22$ | adrs21 | $\alpha 21$ | dataH1 |
| B S. | ID23 | $\beta 23$ | adrs22 | $\alpha 22$ | dataH2 |
| C S. | ID24 | $\beta 24$ | adrs23 | $\alpha 23$ | dataH3 |

Fig. 7

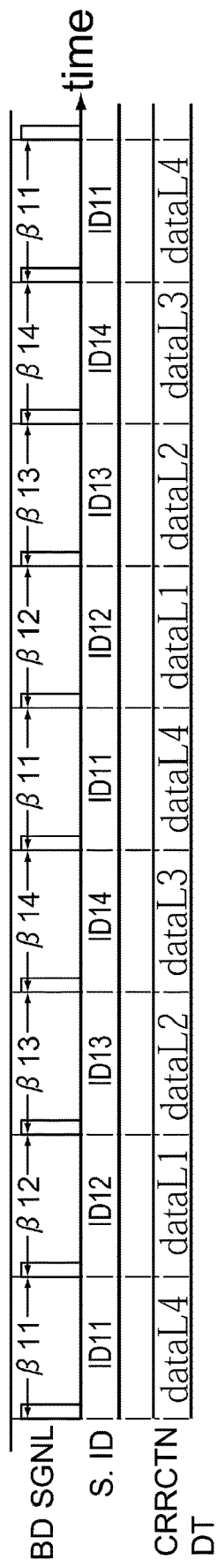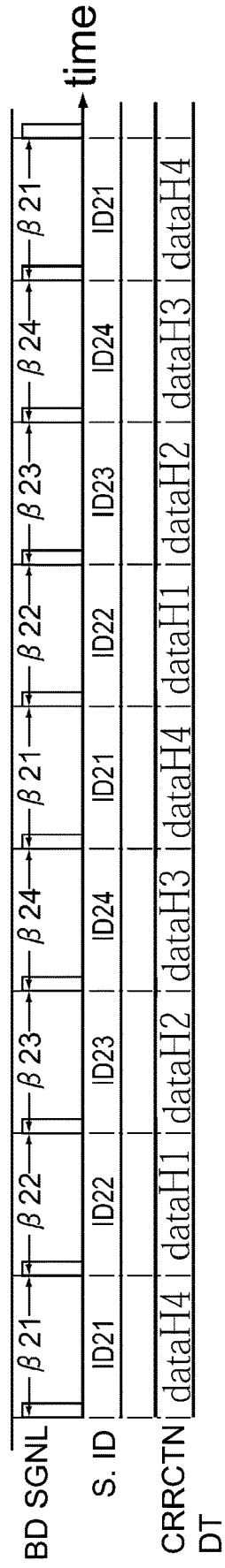
Fig. 8

(a)
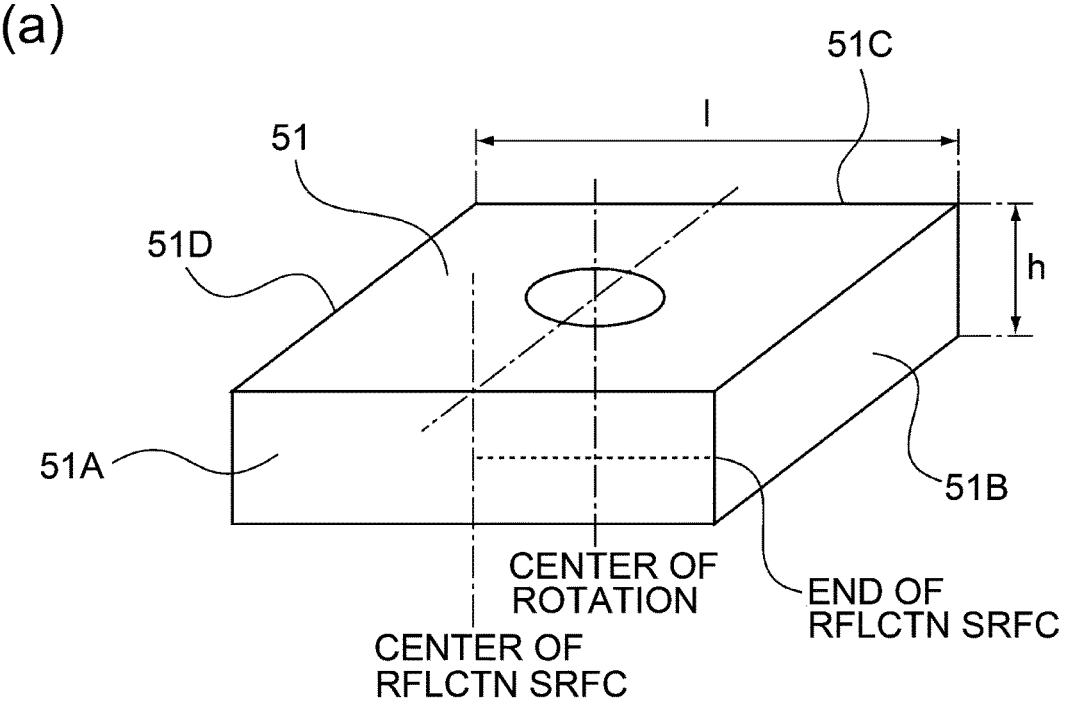
(b)
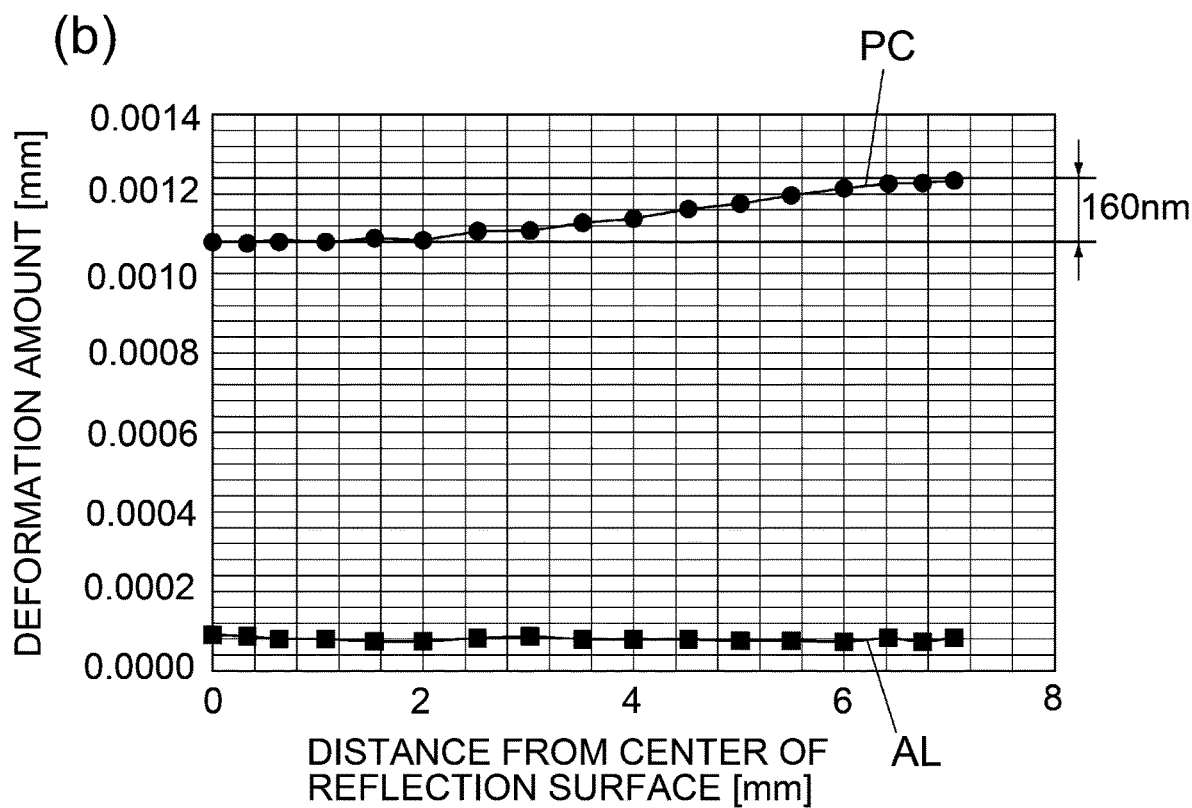
Fig. 11

(a)

CORRECTION DATA STORING PORTION

| R.S. | BD PRD [$\mu$ sec] | DVTN CRRCTN DT [$\mu$ m] ||| CRRCTN PRMTR || TEMP. CRRCTN DATA [$\mu$ m] | AD-DRESS |
|---|---|---|---|---|---|---|---|---|
| | | DATA NAME | START | CENTER | END | X | Z | | |
| A | 749.969 | dataL1 | 13 | 62 | 111 | 0.52 | 3.3 | 17.3 | adrs1 |
| B | 750.097 | dataL2 | 7 | 28 | 50 | 0.18 | 0.2 | 5.5 | adrs2 |
| C | 749.929 | dataL3 | 13 | 60 | 107 | 0.4 | 2.7 | 13.4 | adrs3 |
| D | 750.053 | dataL4 | 7 | 34 | 61 | 0.2 | 0.01 | 6.9 | adrs4 |

(b)

(a) CORRECTION DATA STRORING PORTION

| R.S. | BD PRD[$\mu$ sec] | | DVTN CRRCTN DT | AD-DRESS | CRRCTN PRMTR | |
|---|---|---|---|---|---|---|
| A | $\alpha 1$ | 749.969 | dataL1 | adrs1 | x1 | z1 |
| B | $\alpha 2$ | 750.097 | dataL2 | adrs2 | x2 | z2 |
| C | $\alpha 3$ | 749.929 | dataL3 | adrs3 | x3 | z3 |
| D | $\alpha 4$ | 750.053 | dataL4 | adrs4 | x4 | z4 |

(b) SCANNING PERIOD STORING PORTION

| S. ID | BD PRD [$\mu$ sec] | |
|---|---|---|
| 1 S. (ID1) | $\beta 1$ | 749.969 |
| 2 S. (ID2) | $\beta 2$ | 750.097 |
| 3 S. (ID3) | $\beta 3$ | 749.929 |
| 4 S. (ID4) | $\beta 4$ | 750.053 |

Fig. 16

DFFRNC = 4

|  | SCN PRD STRNG PRTN OF S. I. SGNL GNRTR | | CRRCTN DT STRNG PRTN | | |
|---|---|---|---|---|---|
|  | SURFACE ID | BD PERIOD | ADDRESS | BD PRD | DVTN CRRCTN DT |
| D S. | ID1 | $\beta 1$ | adrs4 | $\alpha 4$ | dataL4 |
| A S. | ID2 | $\beta 2$ | adrs1 | $\alpha 1$ | dataL1 |
| B S. | ID3 | $\beta 3$ | adrs2 | $\alpha 2$ | dataL2 |
| C S. | ID4 | $\beta 4$ | adrs3 | $\alpha 3$ | dataL3 |

Fig. 17

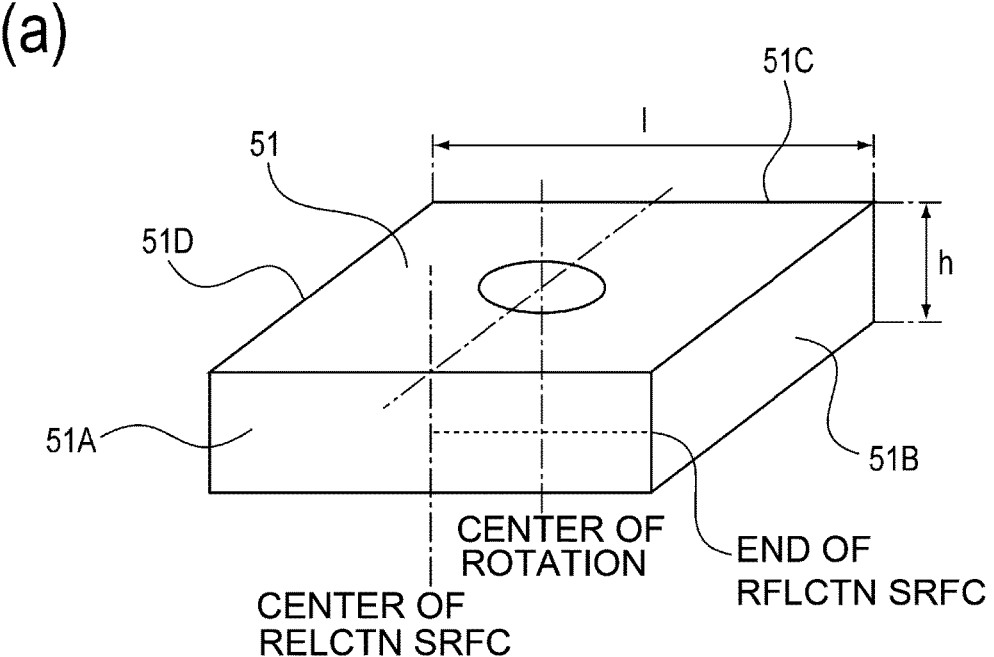
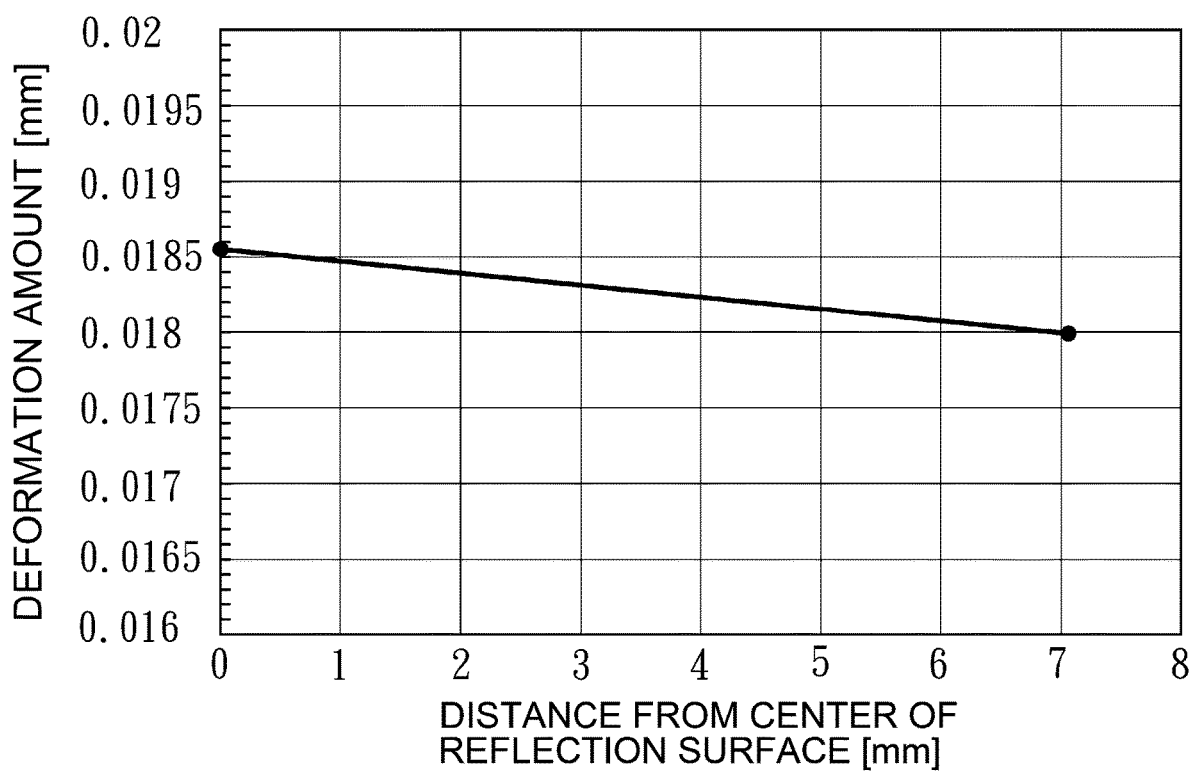
Fig. 23

IMAGE FORMING APPARATUS

This application is a division of application Ser. No. 16/654,429 filed Oct. 16, 2019, currently pending, and claims priority under 35 U.S.C. § 119 from Japan application No. JP 2018-197221 filed in Japan on Oct. 19, 2018 and from Japan application No. JP 2018-197220 filed in Japan on Oct. 19, 2018; the content of all of which are incorporated herein by reference as if set forth in full.

FIELD OF THE INVENTION AND RELATED ART

The present invention relates to an image forming apparatus, such as a laser printer, a copying machine or a facsimile machine, including an optical scanning apparatus for scanning a surface-to-be-scanned with laser light emitted from a light source and deflected by a deflector.

In a conventional optical scanning apparatus used in an image forming apparatus such as the laser printer, the laser light emitted from the light source is optically modulated depending on an image signal, and the modulated laser light is deflected by the deflector comprising, for example, a rotatable polygonal mirror and then a photosensitive drum is scanned with the deflected laser light, so that an image is formed on a photosensitive drum surface as the surface-to-be-scanned by a scanning lens such as an fθ lens, whereby an electrostatic latent image is formed on the photosensitive drum. Then, the electrostatic latent image on the photosensitive drum is visualized (developed) into a toner image by a developing device, and the toner image is transferred onto a recording material such as recording paper, and the recording material is sent to a fixing device, and then the toner image (toner) on the recording material is heat-fixed on the recording material, so that printing is carried out.

Reflecting surfaces of the rotatable polygonal mirror are subjected to high-precision processing in order to deflect the laser light with high accuracy and then to scan the photosensitive drum surface with the laser light. However, due to downsizing or the like of the optical scanning apparatus in these days, a variation in accuracy of the respective reflecting surfaces of the rotatable polygonal mirror has an influence on a quality of a printed image. Therefore, a technique in which the reflecting surface of the rotatable polygonal minor is identified and image density non-uniformity is electrically corrected for each of the reflecting surfaces is proposed (Japanese Patent 5733897).

Further, deviation occurs in a deflection scanning direction (main scan direction) of the rotatable polygonal mirror due to a mounting error of the optical scanning apparatus to the image forming apparatus, a change in refractive index of the fθ lens, and the like. The deviation leads to a deterioration of the image quality and is not preferred, and therefore, a technique in which the deviation is corrected by changing an image clock for the deviation in the main scan direction is proposed (Japanese Patent 5041583).

Further, a proposal in which as a material of the rotatable polygonal minor, aluminum is used in general, but a surface shape of the reflecting surfaces can be freely set by using plastic and thus leads to improvement in degree of freedom of design is made (Japanese Laid-Open Patent Application 2004-102006).

However, when the material of the rotatable polygonal minor is the plastic, during high-speed rotation of the rotatable polygonal mirror, the reflecting surfaces are deformed by centrifugal force. Part (b) of FIG. 11 is a numerical value simulation of reflecting surface deformation when a rotatable polygonal minor 51 constituted by four reflecting surfaces 51A to 51D shown in part (a) of FIG. 11 is rotated at a high speed. As the material of the rotatable polygonal mirrors, the case of aluminum (Al) which is conventional metal and the case of polycarbonate (PC) which is a resin material are set, and the numerical simulation was performed at a rotational frequency (speed) of 45000 rev·min$^{-1}$ for each of the respective rotatable polygonal mirrors.

In part (a) of FIG. 11, a size l×h of each of the reflecting surfaces of the rotatable polygonal mirror 51 is about 14 mm×2 mm. A dimension l of the reflecting surface is a length of the reflecting surface from one end to the other end with respect to a longitudinal direction of the reflecting surfaces. A dimension h of the reflecting surface is a length of the reflecting surface from one end to the other end with respect to a widthwise (height) direction perpendicular to the longitudinal direction and is also a length of the rotatable polygonal mirror passing through a rotation center of the rotatable polygonal mirror.

The ordinate of a graph shown in part (b) of FIG. 11 represents a deformation amount of the reflecting surface with respect to a direction perpendicular to the reflecting surface shown in part (a) of FIG. 11. The abscissa of the graph shown in part (b) of FIG. 11 represents a distance from a reflecting surface center to an end of the reflecting surface with respect to the main scan direction (i.e., a length of half of the reflecting surface with respect to the longitudinal direction). In part (b) of FIG. 11, the deformation amount of the reflecting surface, with respect to the direction perpendicular to the reflecting surface, from the reflecting surface center to the end of the reflecting surface is shown. Incidentally, in part (a) of FIG. 11, the dimension 1 of the reflecting surface of the rotatable polygonal minor is about 14 mm, and therefore, a length l/2 from the reflecting surface center to the end of the reflecting surface is about 7 mm.

From the graph shown in part (b) of FIG. 11, in the case where the material of the rotatable polygonal mirror is aluminum, there is substantially no deformation amount from the reflecting surface center to the end of the reflecting surface. However, in the case where the material of the rotatable polygonal minor is polycarbonate, with respect to the main scan direction (longitudinal direction) of the reflecting surface, deformation in an amount of about 160 nm generates from the reflecting surface center to the end of the reflecting surface. In general, as regards flatness of the reflecting surface, λ/5 (λ (wavelength)=632.8 nm) is needed, so that the deformation amount of about 160 nm generated only by dynamic deformation due to rotation of the rotatable polygonal mirror is an optically large deformation amount.

FIG. 12 shows a scanning time jitter in a certain section of laser light which is reflected by each reflecting surface and which is then subjected to deflection scanning when the rotatable polygonal mirror made of the plastic in actually rotated. The ordinate shown in FIG. 12 is the scanning time jitter and principally represents a jitter amount due to the flatness of each reflecting surface. In this case, the jitter amount (scanning time jitter is represented by a percentage obtained by dividing a value, obtained by subtracting a minimum from a maximum of a scanning time of each reflecting surface (of the 4 surfaces) of the rotatable polygonal mirror, by an average scanning time. The abscissa shown in FIG. 12 is a rotational frequency (rotational speed) of the rotatable polygonal mirror. From FIG. 12, it is understood that the jitter amount due to the flatness of each reflecting surface changes depending on the rotational frequency. When the jitter amount changes depending on the rotational frequency of the rotatable polygonal mirror, an image forming (imaging) position on the photosensitive drum with respect to the main scan direction deviates. Usually, in the case where the material of the rotatable polygonal mirror is aluminum, the jitter amount due to the flatness of each reflecting surface is substantially unchanged depending on the rotational frequency. On the other hand, when the material of the rotatable polygonal mirror is the plastic such as polycarbonate, as described above using parts (a) and (b) of FIG. 11, large deformation generates on the reflecting surface by rotation of the rotatable polygonal mirror. In the numerical value simulation shown in part (b) of FIG. 11, a deformation of a specific reflecting surface of the rotatable polygonal minor made of the plastic is shown. In actuality, as shown in FIG. 12, by influences such as a deviation in manufacturing of the rotatable polygonal minor itself and a deviation in assembling to a deflector, there is a possibility that a difference in deformation amount among the respective reflecting surfaces is different depending on the rotational frequency.

The image forming apparatus is operable in various printing modes, and for example, a printing speed is changed depending on a kind of paper (sheet) subjected to printing. In this case, the change in printing speed is made by a change in rotational frequency of the rotatable polygonal mirror in the deflector in some instances. For example, the case where the rotatable polygonal mirror is rotated at a rotational frequency of 40000 rev·min$^{-1}$ by a single deflector and the case where the rotatable polygonal minor is rotated at a rotational frequency of 24000 rev·min$^{-1}$ by the single deflector exist. At this time, in FIG. 12, the jitter amount at the time of the reflecting surface of 40000 rev·min$^{-1}$ is about 0.032%, and the jitter amount at the time of the reflecting surface of 24000 rev·min$^{-1}$ is about 0.026%. The difference in jitter amount between the respective rotational frequencies is about 0.006%, and when the difference is converted into a distance, for example, in the case where a short-side length of 210 mm of A4-size paper is taken into consideration, the distance is about 12 μm. That is, in the case where the rotatable polygonal mirror includes 4 surfaces, 4 scanning lines cause a deviation of at least about 12 μm in the main scan direction relative to each other (deviation of the scanning lines in the main scan direction).

When a periodical positional deviation of about 12 μm is generated by the 4 scanning lines, there is a liability that moire appears in an image.

A principal object of the present invention is to realize an image forming apparatus in which even when the rotational frequency of the rotatable polygonal mirror changes, the moire does not occur by making correction of the deviation in the main scan direction of each reflecting surface in the respective rotational frequencies.

SUMMARY OF THE INVENTION

According to an aspect of the present invention, there is provided an image forming apparatus comprising: a photosensitive member; and a scanning unit configured to scan the photosensitive member with laser light depending on image information, wherein the scanning unit includes a light source configured to emit the laser light depending on the image information, a rotatable polygonal minor which is configured to deflect the laser light emitted from the light source and which is made of a resin material, and a sensor configured to receive the laser light reflected by the rotatable polygonal mirror, wherein the image forming apparatus is operable in a first mode in which the rotatable polygonal mirror is rotated at a first rotational speed and in a second mode in which the rotatable polygonal mirror is rotated at a second rotational speed faster than the first rotational speed, wherein the image forming apparatus further comprises, a surface identifying portion configured to identify a plurality of reflecting surfaces of the rotatable polygonal minor on the basis of a signal outputted from the sensor, and a storing portion configured to prestore correction data for correcting deviation in a main scan direction of the laser light reflected by each of a plurality of reflecting surface, the correction data including first correction data for the first rotational speed and second correction data for the second rotational speed, and wherein positional deviation in the main scan direction of the laser light is corrected on the basis of the first correction data or the second correction data.

According to another aspect of the present invention, there is provided an image forming apparatus comprising: a photosensitive member; and a scanning unit configured to scan the photosensitive member with laser light depending on image information, wherein the scanning unit includes a light source configured to emit the laser light depending on the image information, a rotatable polygonal minor which is configured to deflect the laser light emitted from the light source and which is made of a resin material, and a sensor configured to receive the laser light reflected by the rotatable polygonal mirror, a surface identifying portion configured to identify a plurality of reflecting surfaces of the rotatable polygonal minor on the basis of a signal outputted from the sensor; a storing portion configured to prestore deviation correction data for correcting deviation in a main scan direction of the laser light reflected by each of a plurality of reflecting surfaces, and a predetermined correction parameter used for calculating temperature correction data for correcting the deviation correction data; a temperature detecting portion configured to detect a temperature of an inside of the image forming apparatus; and a correction data controller configured to correct the deviation correction data to correction data depending on a temperature change of a space in which the rotatable polygonal mirror is provided, by calculating temperature correction data depending on the temperature change of the space on the basis of the temperature detected by the temperature detecting portion and the correction parameter and then by using the calculated temperature correction data, wherein positional deviation in the main scan direction of the laser light is corrected on the basis of the correction data corrected by the correction data controller.

Further features of the present invention will become apparent from the following description of exemplary embodiments with reference to the attached drawings.

Parts (a) and (b) of FIG. 4 are time-series diagrams each showing an example of association between a surface ID and a BD (cyclic) period β measured at a scan period measuring portion.

Figure 5:
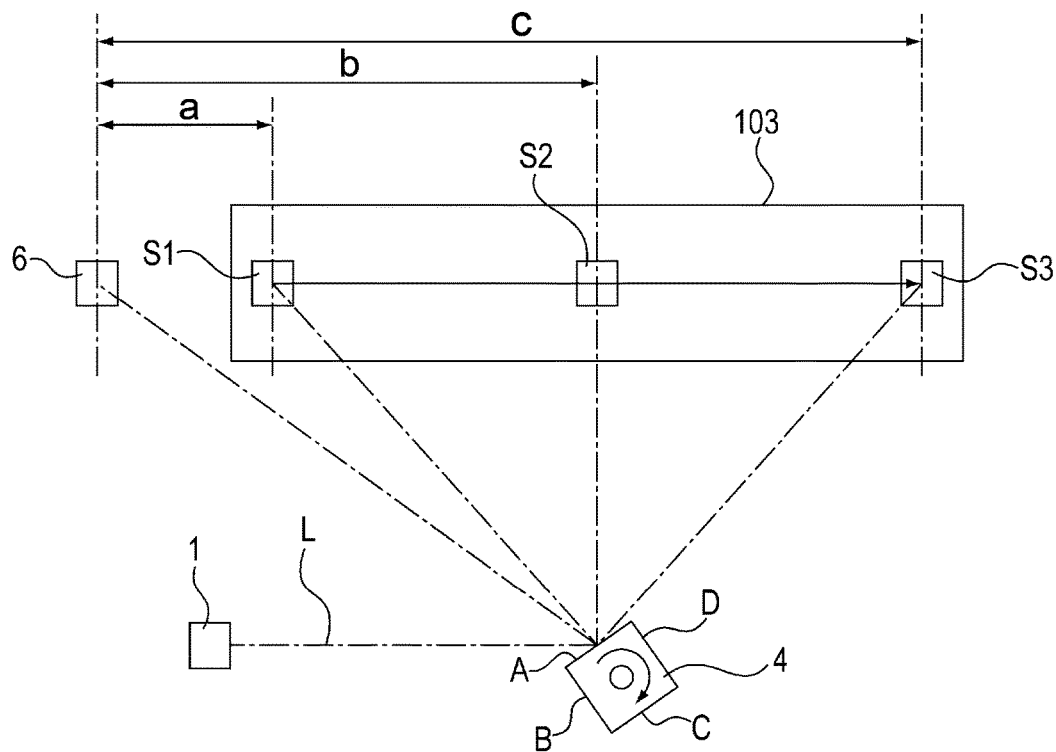

Parts (a) of FIG. 5 is a table showing a specific example of a rotational frequency, the BD period and correction data, which are stored in a correction data storing portion in the embodiment, and part (b) of FIG. 5 is a schematic view showing a structure for measuring the BD period of a rotatable polygonal mirror and the correction data corresponding thereto.

Part (a) of FIG. 6 is a table showing an example of a BD period α stored in the correction data storing portion, and part (b) of FIG. 6 is a table showing an example of the BD period β measured and stored in a scan period storing portion.

Parts (a) and (b) of FIG. 7 are tables each showing an example an association relationship among the surface ID and the BD period β at a specific portion, and the BD period α in the correction data storing portion in the case of succeeding in pattern match.

Parts (a) and (b) of FIG. 8 are time-series diagrams each showing an example of association among the surface ID, the BD period β measured at the scan period measuring portion, and the correction data stored in the correction data storing portion.

Figure 9:
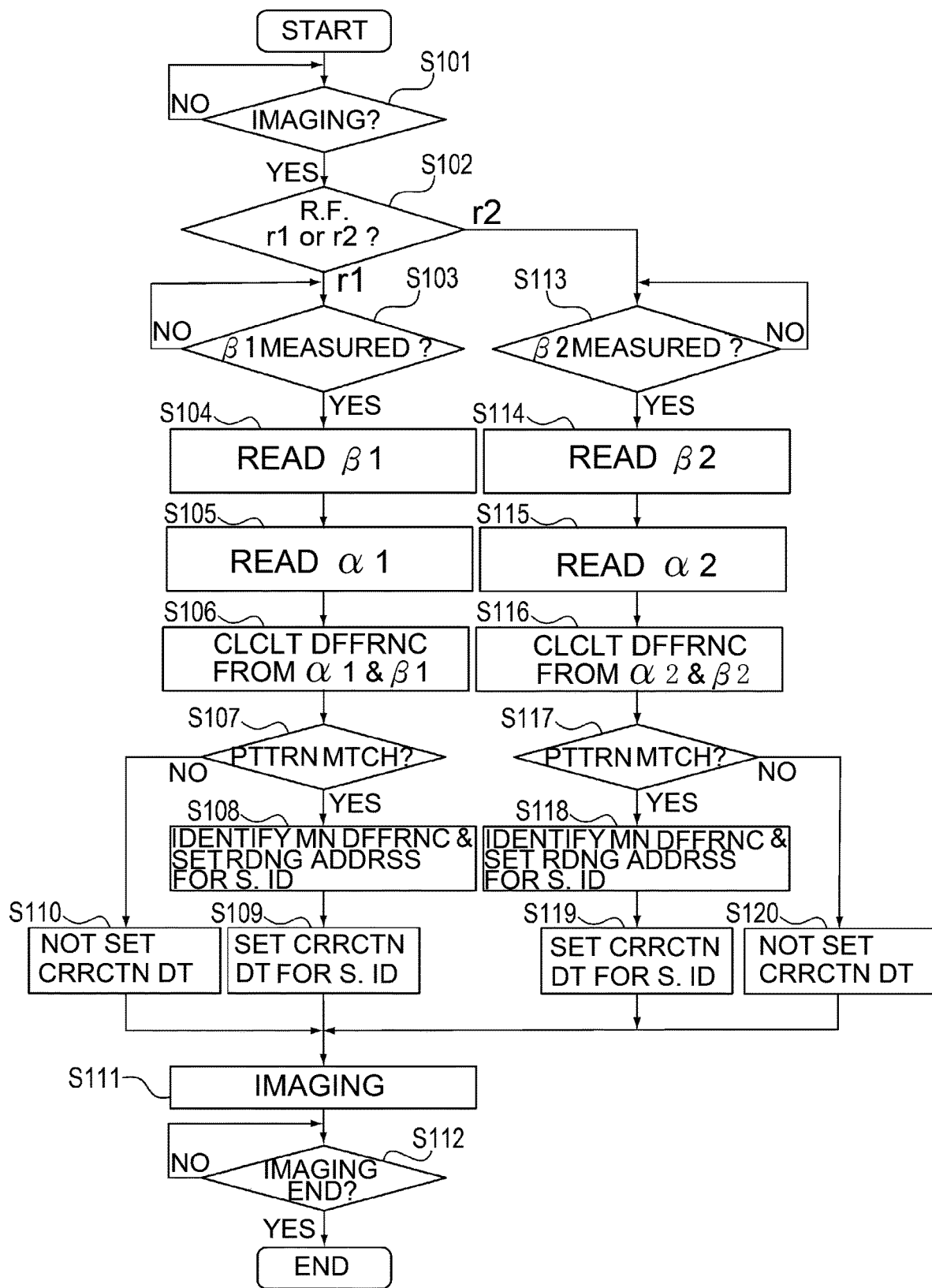

FIG. 9 is a flowchart of a process of reflecting surface identification and main scan magnification deviation correction in the embodiment.

Figure 10:
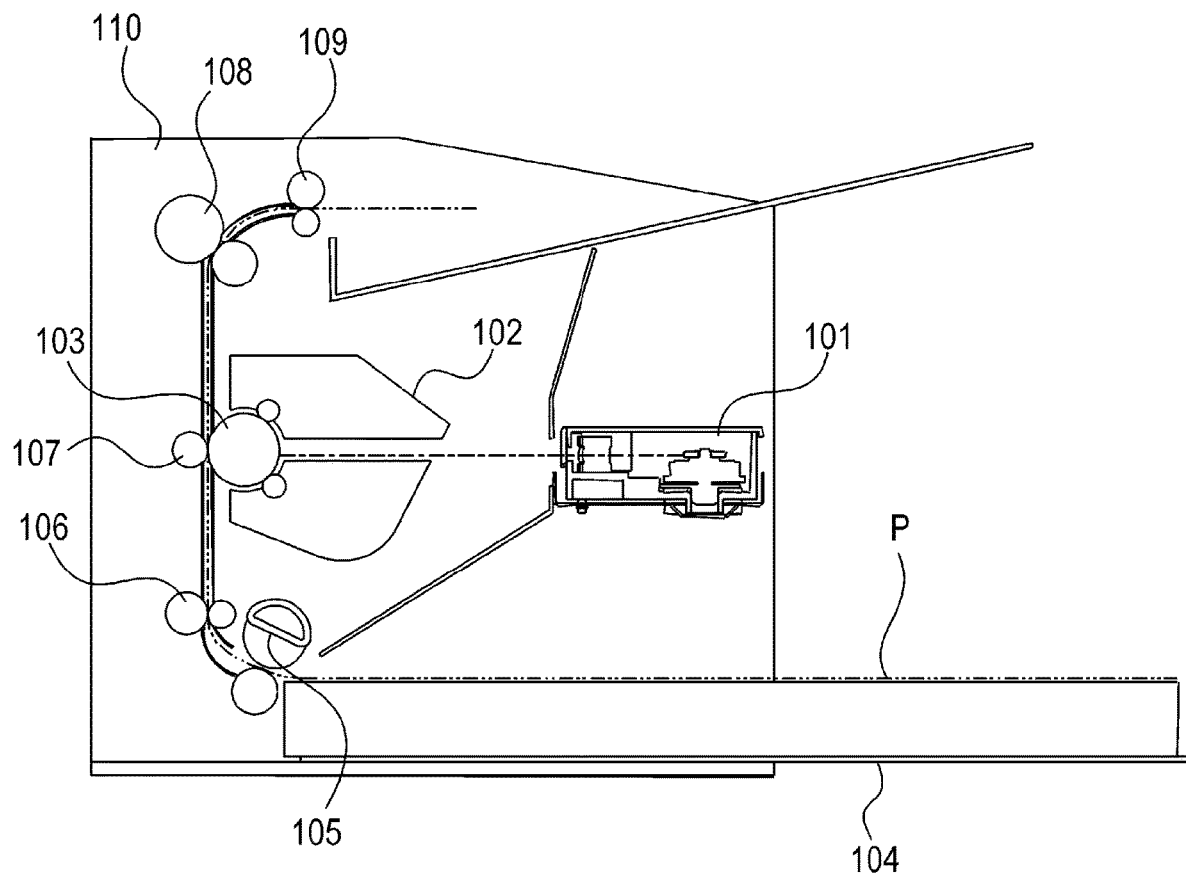

FIG. 10 is a schematic sectional view showing an image forming apparatus according to the embodiment of the present invention.

Part (a) of FIG. 11 is a perspective view of a rotatable polygonal minor, and part (b) of FIG. 11 is a graph showing a numerical value simulation of a deformation amount of a reflecting surface during rotation of the rotatable polygonal mirror.

Figure 12:
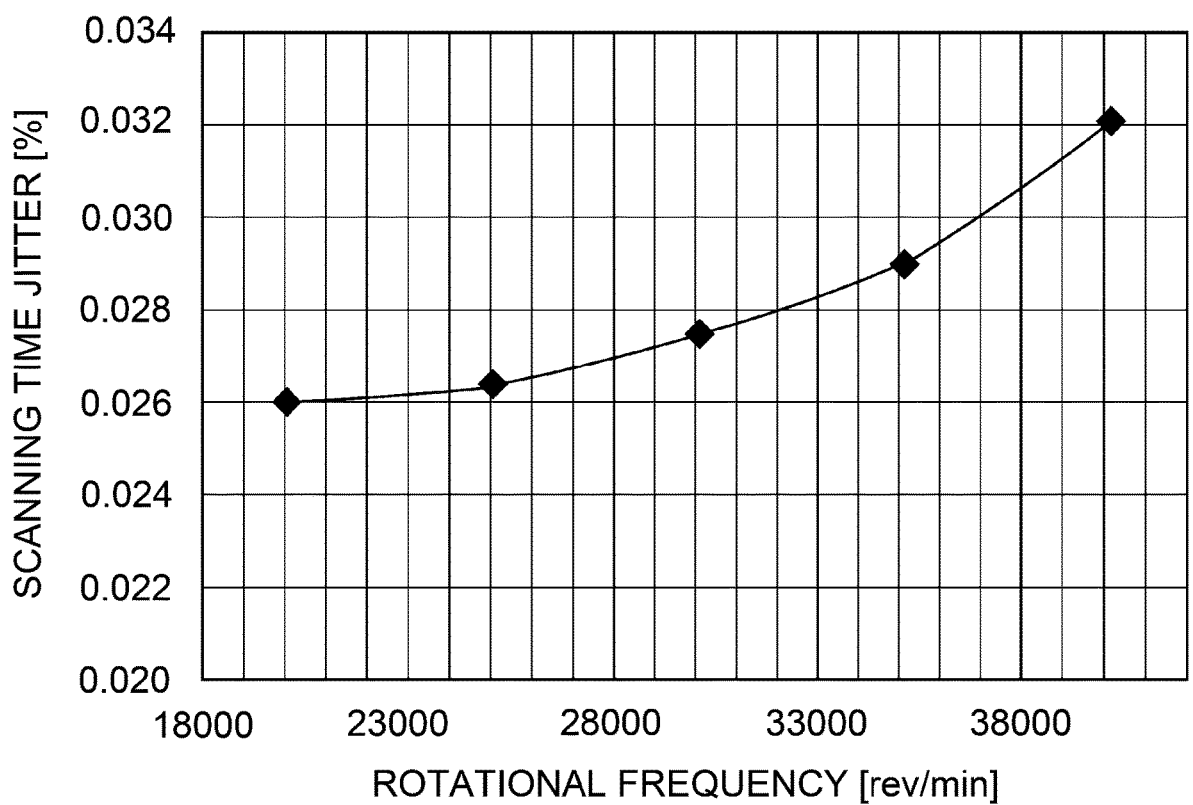

FIG. 12 is a graph showing an example of a scanning time jitter for each of rotational frequencies of a rotatable polygonal mirror made of a plastic material.

Figure 13:
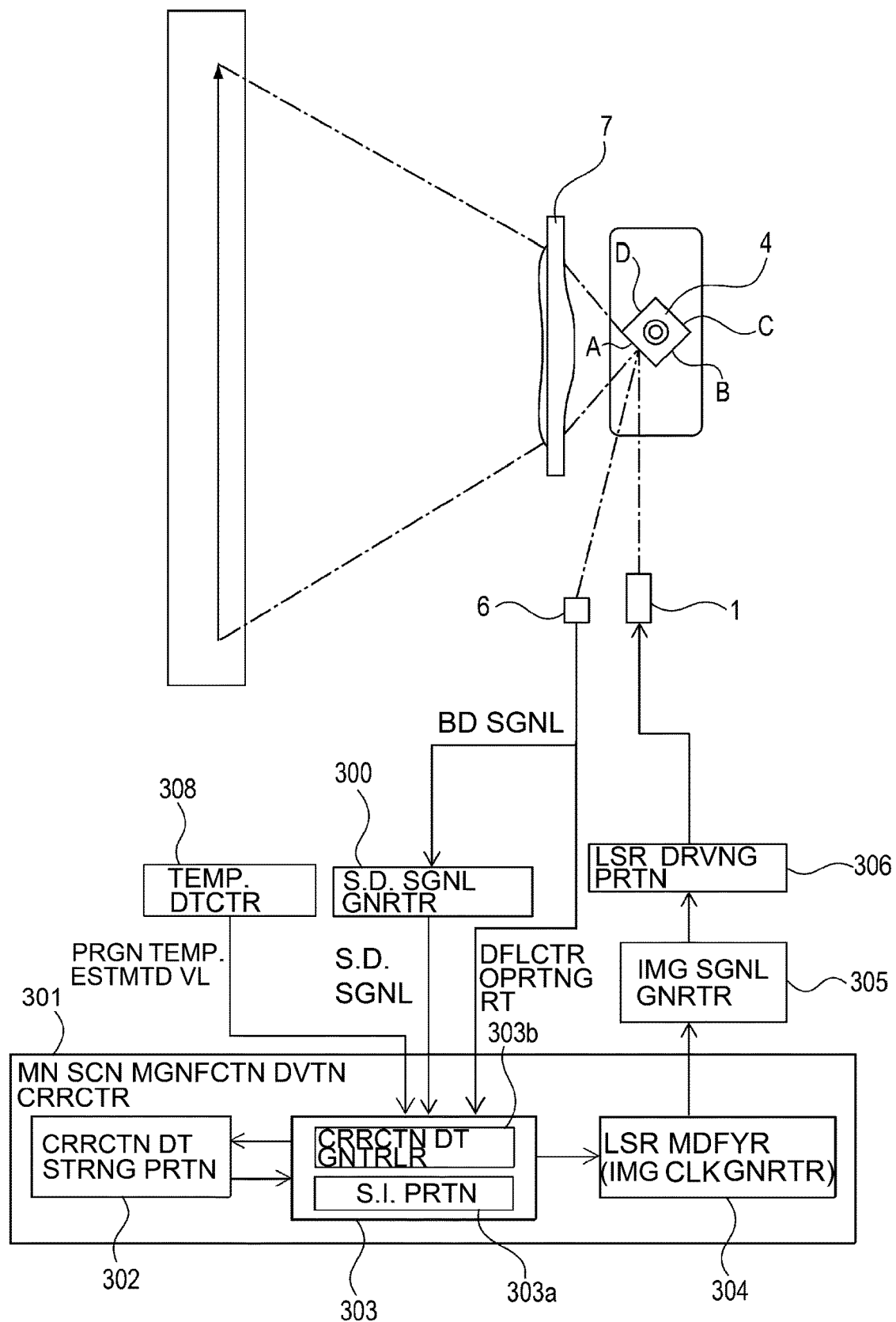

FIG. 13 is a block diagram showing a mechanism for correcting a magnification deviation amount with respect to a main scan direction in the embodiment.

Figure 14:
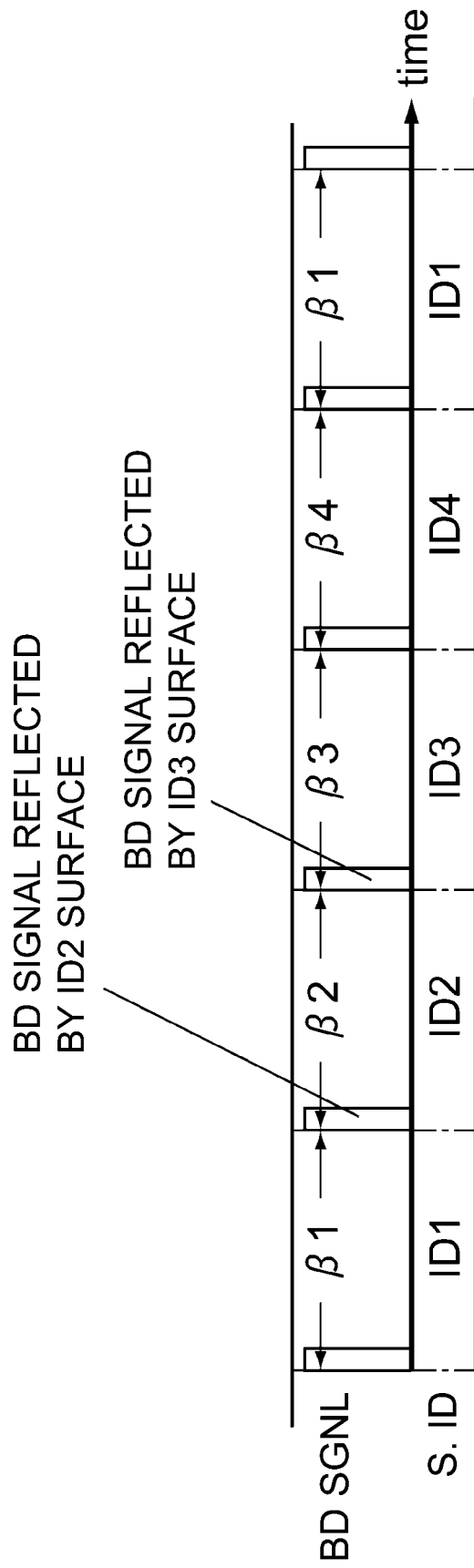

FIG. 14 is a time-series diagrams each showing an example of association between a surface ID and a BD (cyclic) period β measured at a scan period measuring portion.

Figure 15:
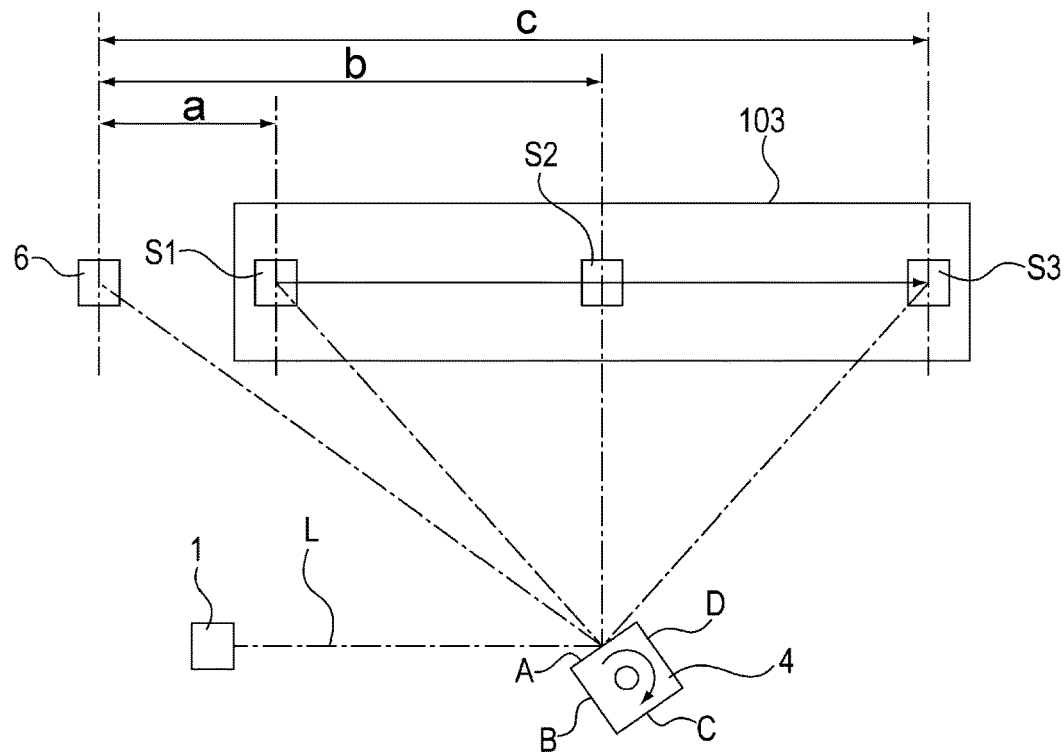

Parts (a) of FIG. 15 is a table showing a specific example of a rotational frequency, the BD period and correction data, which are stored in the correction data storing portion in the embodiment, and part (b) of FIG. 15 is a schematic view showing a structure for measuring the BD period of a rotatable polygonal mirror and the correction data corresponding thereto.

Part (a) of FIG. 16 is a table showing an example of a BD period α stored in the correction data storing portion, and part (b) of FIG. 16 is a table showing an example of the BD period β measured and stored in a scan period storing portion.

FIG. 17 is a table showing an example an association relationship among the surface ID and the BD period β at a specific portion, and the BD period α in the correction data storing portion in the case of succeeding in pattern match.

Figure 18:
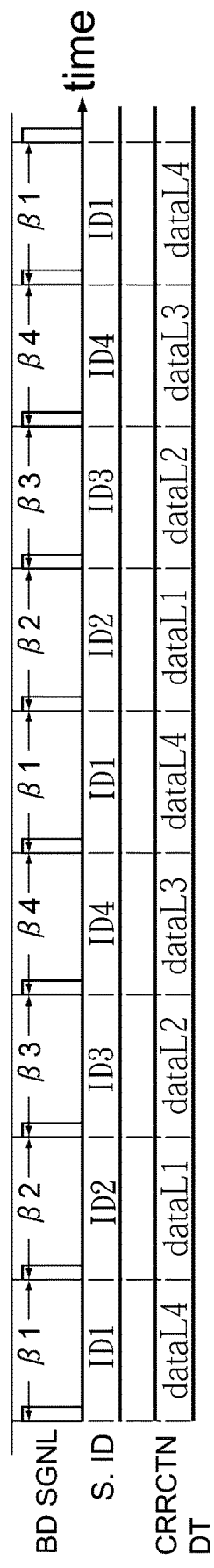

FIG. 18 is a time-series diagram each showing an example of association among the surface ID, the BD period β measured at the scan period measuring portion, and the correction data stored in the correction data storing portion.

Figure 19:
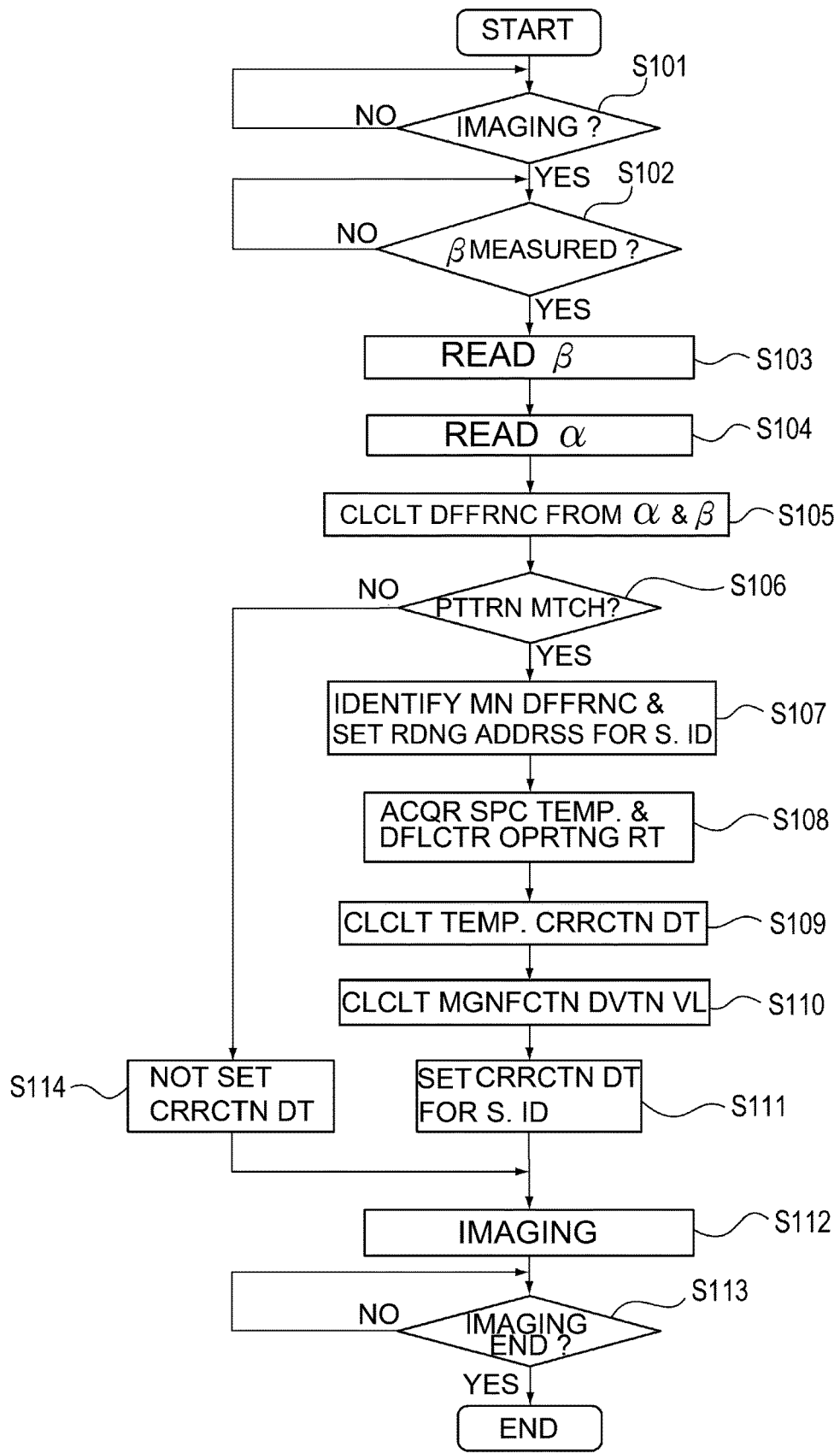

FIG. 19 is a flowchart of a process of reflecting surface identification and main scan magnification deviation correction in the embodiment.

Figure 20:
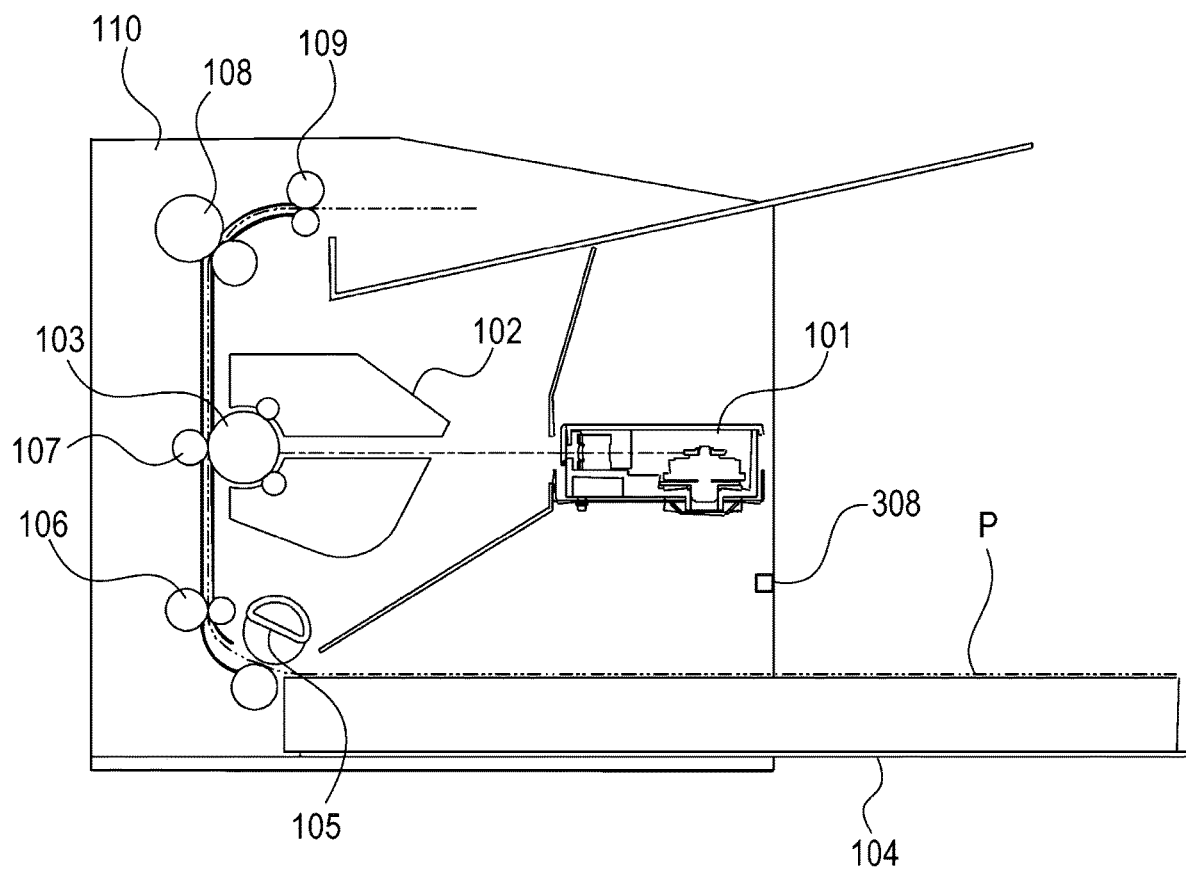

FIG. 20 is a schematic sectional view showing an image forming apparatus.

Figure 21:
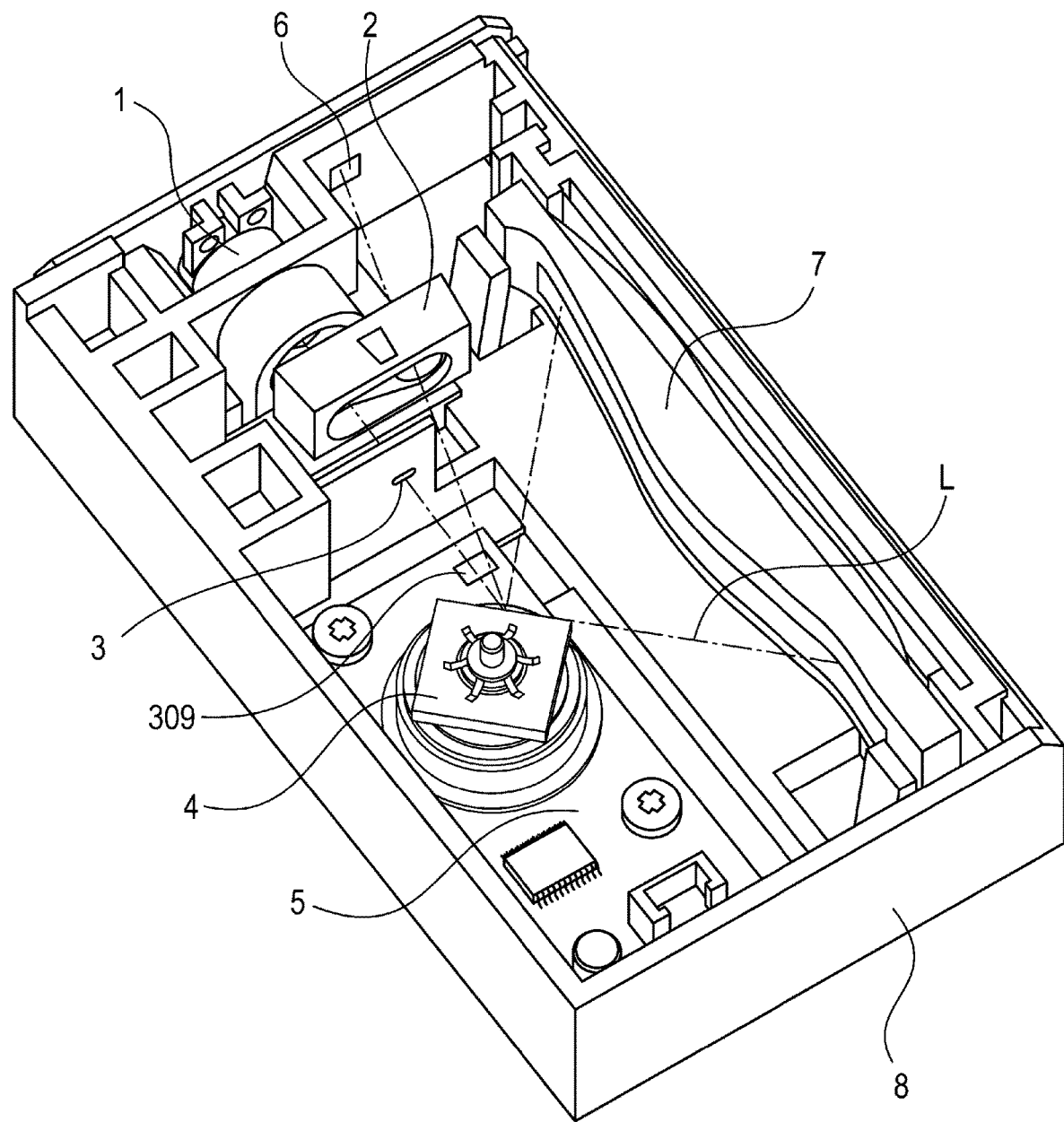

FIG. 21 is a perspective view of an optical scanning apparatus according to a modified example of the embodiment.

Figure 22:
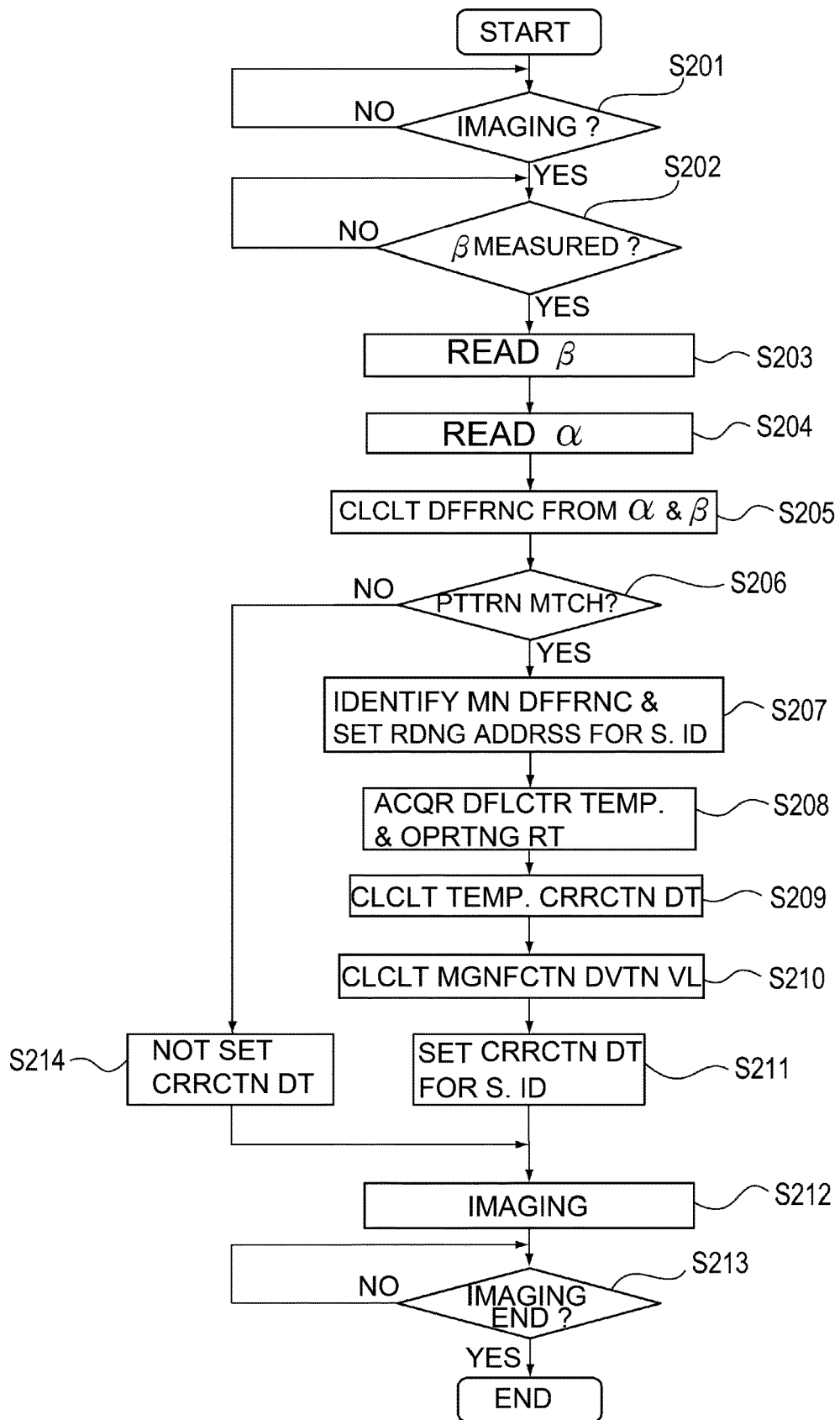

FIG. 22 is a flowchart of a process of reflecting surface identification and main scan magnification deviation correction according to the modified example of the embodiment.

Part (a) of FIG. 23 is a perspective view of a rotatable polygonal mirror, and part (b) of FIG. 23 is a graph showing a numerical value simulation of a thermal deformation amount of a reflecting surface of the rotatable polygonal mirror.

Figure 24:
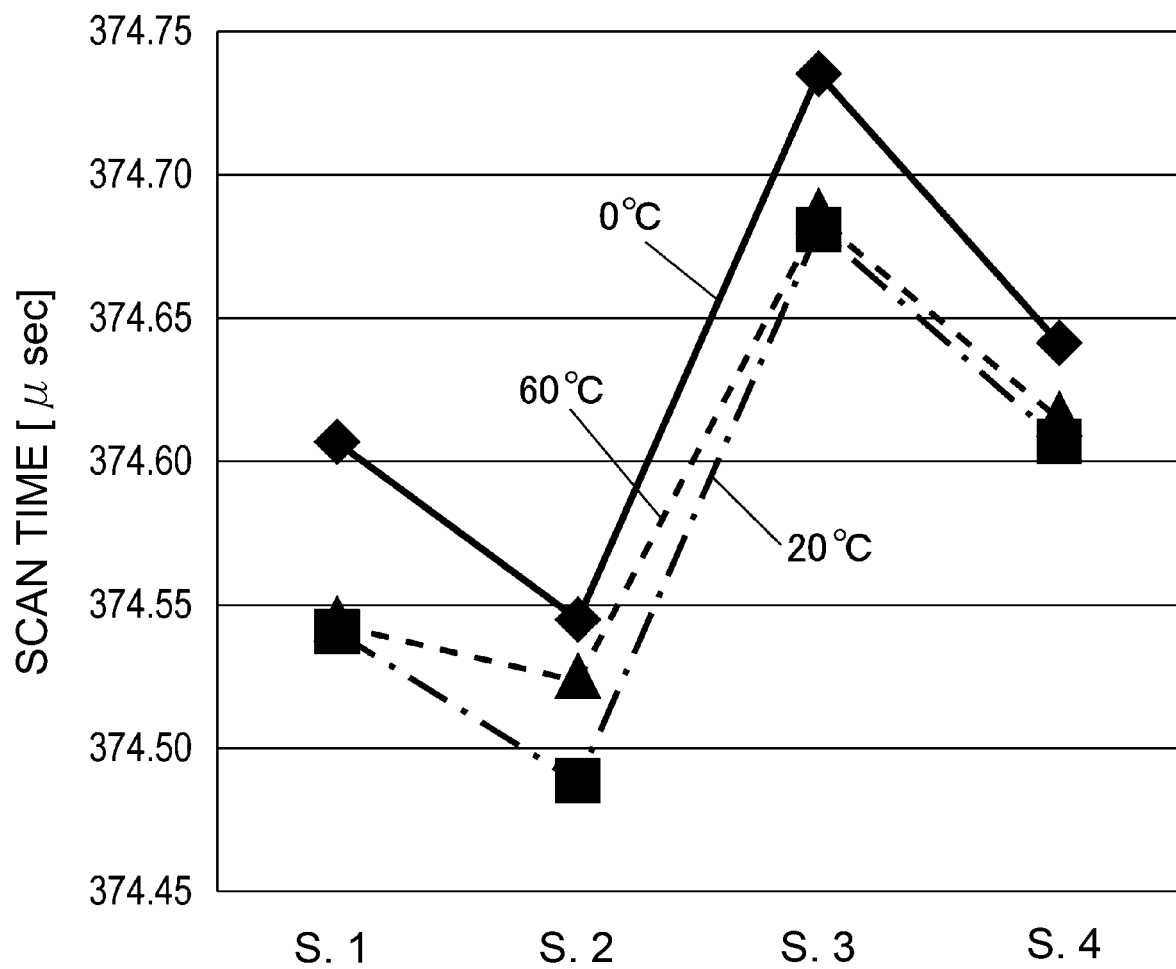

FIG. 24 is a graph showing a change in scanning time of each of reflecting surfaces when a temperature is changed.

Figure 25:
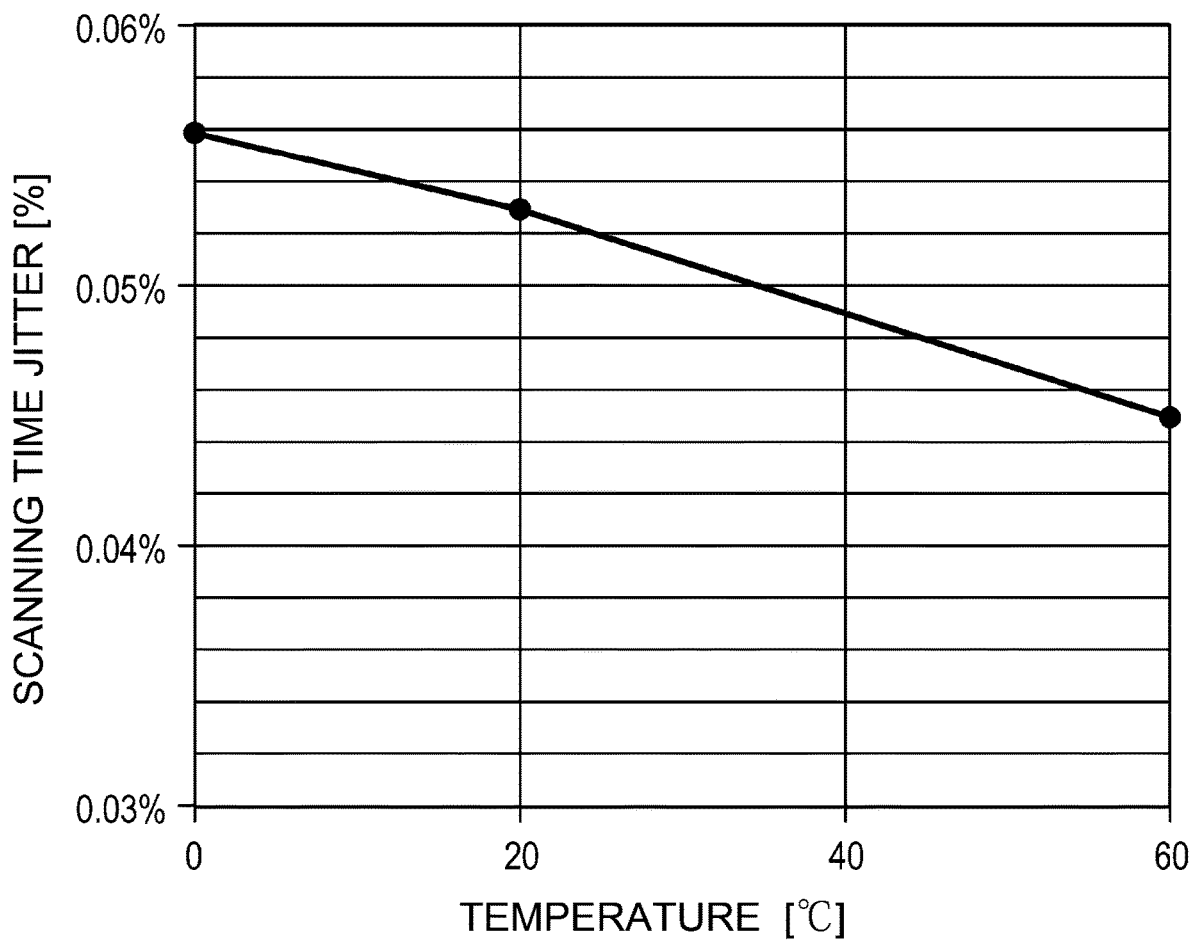

FIG. 25 is a graph showing an example of a scanning time jitter of a plastic rotatable polygonal mirror for each of temperatures.

DESCRIPTION OF EMBODIMENTS

In the following, with reference to the drawings, an image forming apparatus including an optical scanning apparatus according to an embodiment will be described. Incidentally, in the following description, first, the image forming apparatus including the optical scanning apparatus according to the embodiment will be described as an example, and then the optical scanning apparatus in the image forming apparatus will be described. Then, a deflector assembled in the optical scanning apparatus will be described.

[Image Forming Apparatus]

First, an image forming apparatus 110 will be described using FIG. 10. FIG. 10 is a schematic sectional view of the image forming apparatus 110 according to the embodiment in which an optical scanning apparatus 101 is provided. The image forming apparatus 110 includes the optical scanning apparatus 101, and a photosensitive drum as an image bearing member is scanned with laser light by the optical scanning apparatus 101 and then an image is formed on a recording material P such as recording paper on a basis of a latent image formed by scanning. In this embodiment, description will be made using a laser beam printer as an example of the image forming apparatus.

As shown in FIG. 10, in the image forming apparatus (printer) 110, the laser light L based on image information is emitted from the optical scanning apparatus 101 as an exposure means, and a surface of the photosensitive drum 103 as the image bearing member incorporated in a process cartridge 102 is irradiated with the laser light L. Then, the latent image is formed on the photosensitive drum 103 by irradiating the photosensitive drum 103 with the laser light L and by exposing the photosensitive drum 103 to the laser light L. The latent image formed on the photosensitive drum 103 is visualized (developed) as a toner image with toner as a developer. Incidentally, a process cartridge 102 integrally includes the photosensitive drum 103 and a charging means, a developing means and the like as process means actable on the photosensitive drum 103 and is mountable in and dismountable from the image forming apparatus 110.

On the other hand, recording materials P accommodated on a recording material stacking plate 104 are fed while being separated one by one by a feeding roller 105 and is further fed toward a downstream side by a conveying roller pair 106. Onto the fed recording material P, the toner image formed on the photosensitive drum 103 is transferred by a transfer roller 107. The recording material P on which an unfixed toner image is formed is fed toward a further downstream side, and then the toner image is fixed on the recording material P by a fixing device 108 including a heating member (heating) therein. Thereafter, the recording material P is discharged to an outside of the image forming apparatus 110 by a discharging roller pair 109.

Incidentally, in this embodiment, the charging means and the developing means which are used as the process means actable on the photosensitive drum 103 are integrally assembled with the photosensitive drum 103 in the process cartridge 102. However, the process means is not limited thereto, and the process means may also be constituted as separate members from the photosensitive drum 103.

[Optical Scanning Apparatus]

Figure 1:
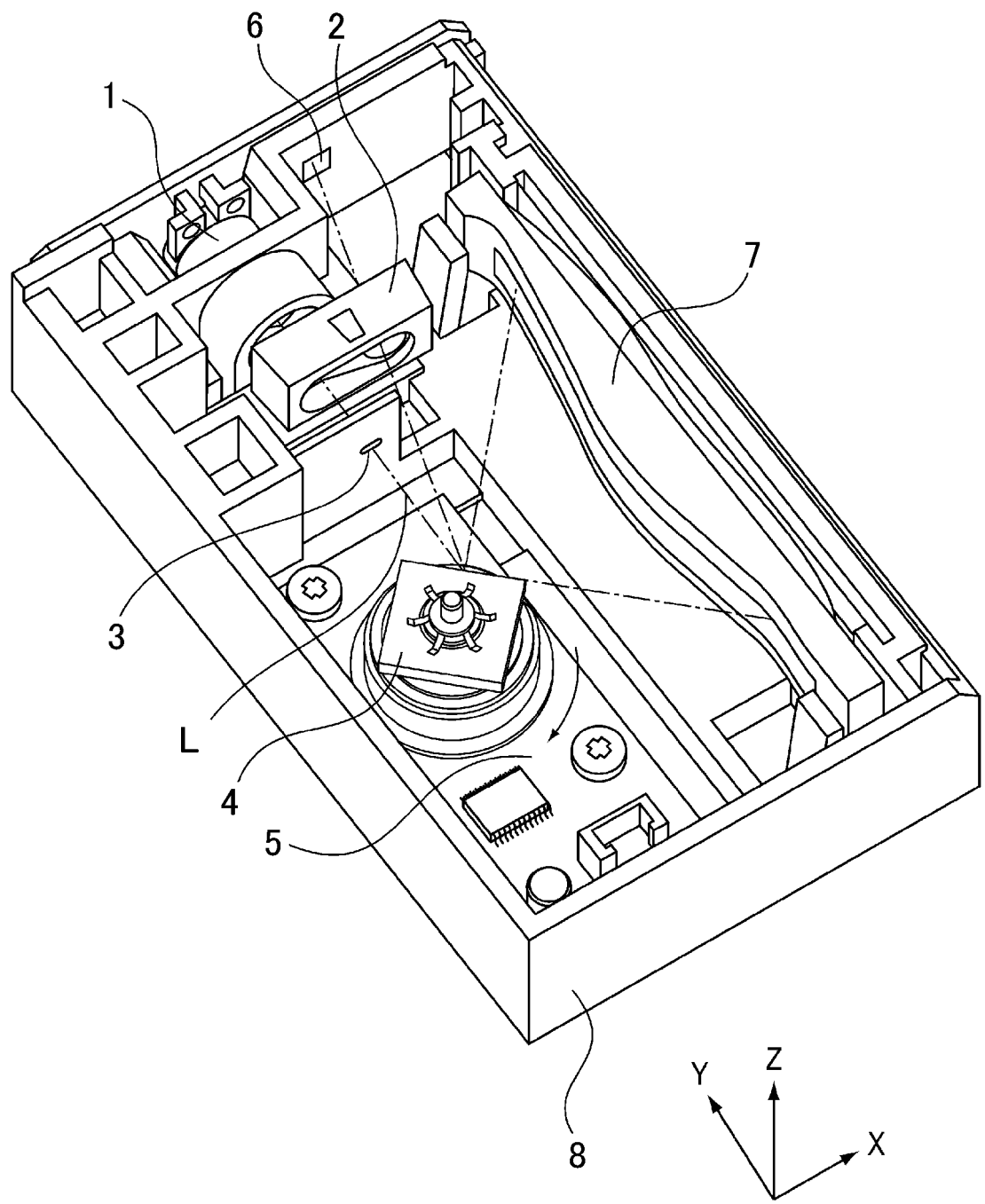
FIG. 1 is a perspective view of an optical scanning apparatus according to an embodiment of the present invention.

Next, the optical scanning apparatus in the image forming apparatus 110 will be described using FIG. 1. FIG. 1 is a perspective view of the optical scanning apparatus in this embodiment. An arrow Z direction shown in FIG. 1 is an axial direction of a rotation shaft 10 shown in FIG. 2. An arrow X direction is a direction perpendicular to the arrow Z direction, and an arrow Y direction is a direction perpendicular to the arrow Z direction and the arrow X direction.

As shown in FIG. 1, the optical scanning apparatus 101 includes the following optical members. The optical scanning apparatus 101 includes a semiconductor laser unit 1 and a composite anamorphic collimator lens 2. The semiconductor laser unit 1 is a light source for emitting laser light L. The composite anamorphic collimator lens 2 is a lens prepared by integrally molding an anamorphic collimator lens having functions of a collimator lens and a cylindrical lens in combination and a synchronizing signal detecting lens (BD lens). Further, the optical scanning apparatus 101 includes an aperture stop 3, a deflector 5 for rotationally driving a rotatable polygonal minor 4, a synchronizing signal detecting sensor (BD sensor) 6, and fθ lens (scanning lens) 7. The optical scanning apparatus 101 accommodates the above-described optical members in an optical box 8.

In the above-described constitution, the laser light L emitted from the semiconductor laser unit 1 passes through the aperture stop 3 and a laser light width is restricted, so that an image is formed on the reflecting surface of the rotatable polygonal minor 4 in a focal line shape extending in a main scan direction. Then, this laser light L is subjected to deflection scanning by rotating the rotatable polygonal mirror 4 and is incident on the BD lens of the combined anamorphic collimator lens 2. The laser light L passed through the BD lens enters the synchronizing signal detecting sensor 6. That is, the synchronizing signal detecting sensor 6 receives the laser light L reflected by the respective reflecting surfaces of the rotatable polygonal mirror 4. At this time, a synchronizing signal (BD signal) is detected by the synchronizing signal detecting sensor 6, and this timing is used as synchronization detection timing of a writing start position with respect to the main scan direction. The synchronizing signal (BD signal) is a signal for establishing an image writing start position with respect to the main scan direction at each of the reflecting surfaces of the rotatable polygonal mirror 4. Then, the synchronizing signal detecting sensor 6 outputs the synchronizing signal (BD signal) to a surface discriminating signal generating portion 300 (FIG. 3) described later. Then, the laser light L enters the fθ lens 7. The fθ lens 7 is designed so that the laser light L is concentrated on the photosensitive drum so as to form a spot and so that a scanning speed of the spot is kept at a constant speed. In order to acquire such a characteristic of the fθ lens 7, the fθ lens 7 is formed by an aspherical lens. The laser light L passed through the fθ lens 7 is emitted through an emergent opening of the optical box 8, so that an image is formed on the photosensitive drum by scanning with the laser light 1.

Main scan is performed on the photosensitive drum with the laser light with respect to an axial direction of the photosensitive drum by subjecting the laser light to deflection scanning through rotation of the rotatable polygonal minor 4, and sub-scan is performed by rotationally driving the photosensitive drum about an axis of the cylinder of the photosensitive drum. This direction in which the photosensitive drum is scanned with the laser light with respect to the axial direction thereof is a main scan direction, and the direction in which the photosensitive drum is scanned with the laser light by rotation thereof about the axis is a sub-scan direction perpendicular to the main scan direction. Thus, on the surface of the photosensitive drum, an electrostatic latent image is formed.

[Deflector]

Figure 2:
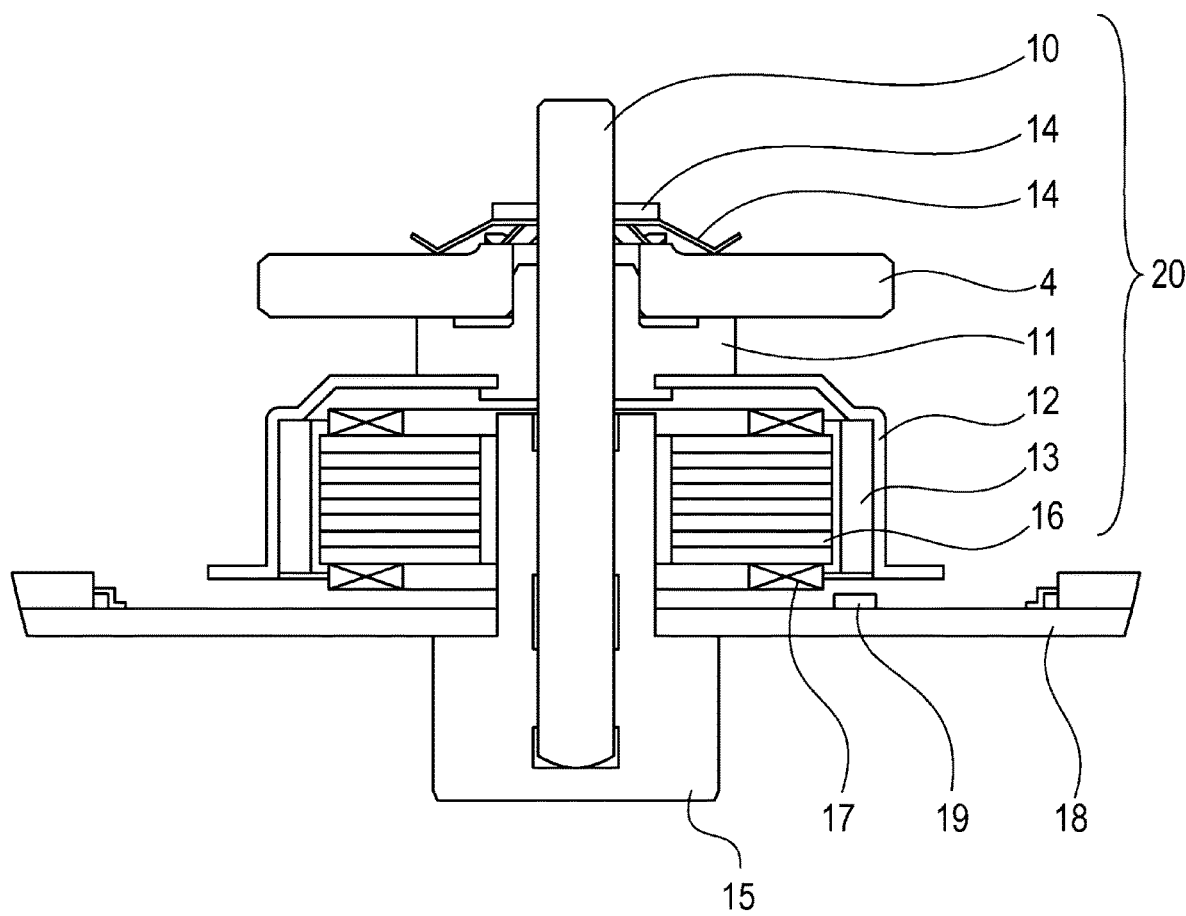
FIG. 2 is a partially sectional view of a deflector in the embodiment of the present invention.

The deflector in the above-described optical scanning apparatus will be described using FIG. 2. FIG. 2 is a partially sectional view of the deflector in this embodiment.

As shown in FIG. 2, the deflector 5 includes a rotor 20 including the rotatable polygonal minor 4, a bearing 15, a stator core 16, a stator coil 17, a circuit board 18, Hall element (magnetic sensor) 19 and the like. The rotor 20 is constituted by, in addition to the rotatable polygonal mirror 4, a rotational shaft 10, a rotor boss 11, a rotor frame 12, a rotor magnet 13 and a fixture 14 of the rotatable polygonal minor 4. A material of the rotatable polygonal mirror 4 is plastic as a resin material such as polycarbonate resin or cycloolefin resin.

In the above-described constitution, when a current is subjected to the stator coil 17, an electromagnetic force is generated between the stator coil 17 and the rotor magnet 13, so that the rotor 20 is rotated about the rotation shaft 10 shaft-supported by the bearing 15. The Hall element 19 is a magnetic sensor for determining timing (rectifying timing) when the current is caused to pass through the stator coil 17, and is disposed below the rotor magnet 13 and detects magnetic poles (N, S) of the rotor magnet 13.

[Correction of Positional Deviation of Each Reflecting Surface with Respect to Main Scan Direction at Each Rotational Frequency of Rotatable Polygonal Mirror 4]

Figure 3:
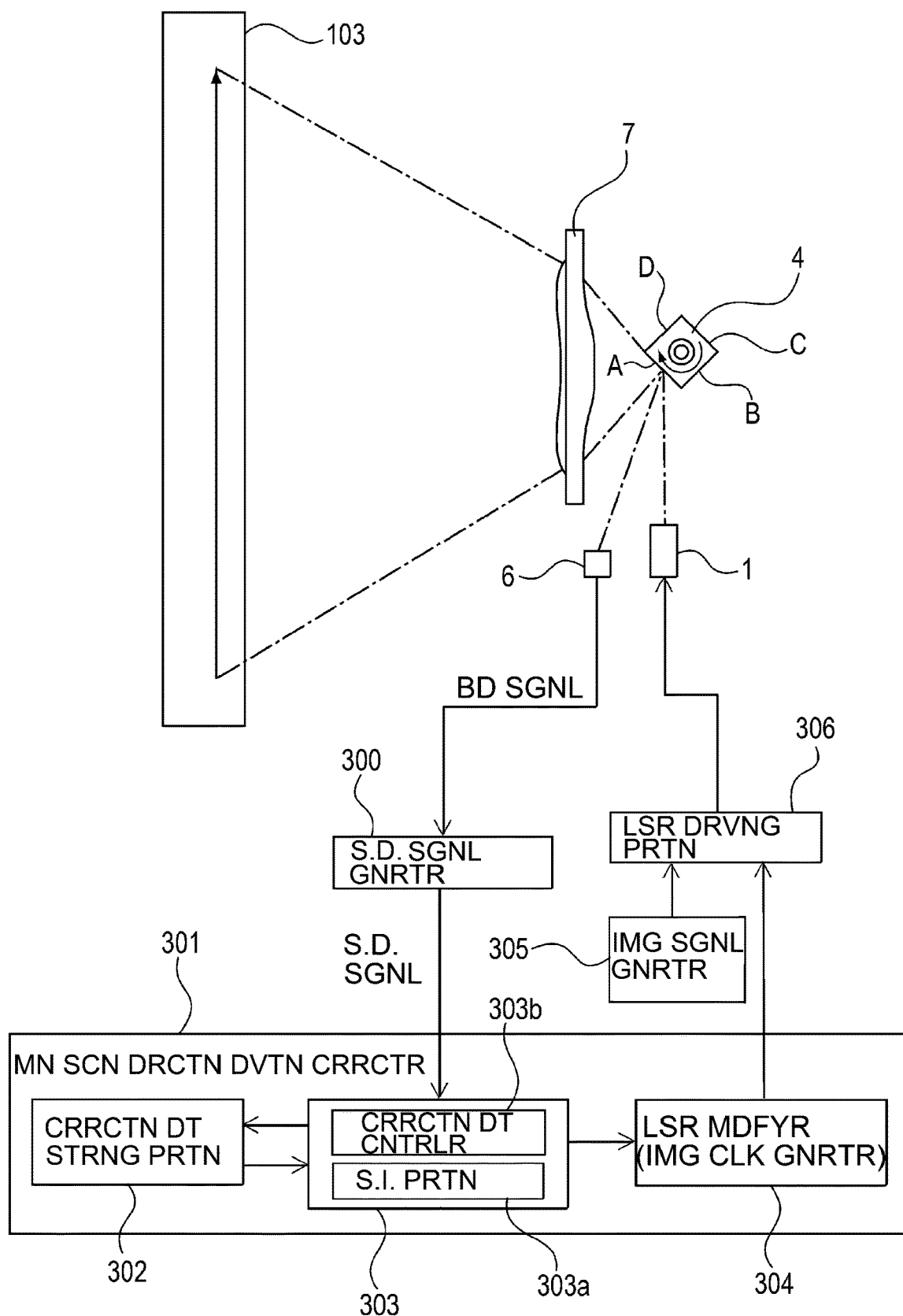
FIG. 3 is a block diagram showing a mechanism for correcting a magnification deviation amount with respect to a main scan direction in the embodiment.

Next, using the drawings, a correcting method of a jitter amount of each reflecting surface with respect to the main scan direction at each rotational frequency of the rotatable polygonal mirror 4 (i.e., positional deviation of scanning line of each reflecting surface with respect to the main scan direction) will be described. FIG. 3 is a block diagram showing a mechanism for correcting a positional amount of scanning line with respect to the main scan direction in this embodiment. Parts (a) and (b) of FIG. 4 are time-series diagrams each showing an example of association between a surface ID and a BD (cyclic) period β measured at a scan period measuring portion. Parts (a) of FIG. 5 is a table showing a specific example of a rotational frequency, (rotational speed), the BD period and correction data for each reflecting surface of the rotatable polygonal mirror, which are stored in a correction data storing portion in this embodiment, and part (b) of FIG. 5 is a schematic view showing a structure for measuring the BD period of each reflecting surface of the rotatable polygonal mirror and the correction data corresponding thereto. Part (a) of FIG. 6 is a table showing an example of a BD period α, a corresponding reflecting surface and corresponding correspond, which are stored in the correction data storing portion, and part (b) of FIG. 6 is a table showing an example of the BD period β and a surface ID of a corresponding reflecting surface, which are measured and stored in a scan period storing portion. Parts (a) and (b) of FIG. 7 are tables each showing an example an association relationship among the surface ID and the BD period β at a surface discriminating signal generating portion, and the BD period α in the correction data storing portion in the case of succeeding in pattern match. Parts (a) and (b) of FIG. 8 are time-series diagrams each showing an example of association among the surface ID, the BD period β measured at the scan period measuring portion, and the correction data stored in the correction data storing portion.

As shown in FIG. 3, in this mechanism, the surface discriminating signal generating portion 300, a main scan position (magnification) deviation correcting portion 301 and an image signal generating portion 305 are included. The main scan direction deviation correcting portion 301 includes a correction data controller 303b relating to control and a surface identifying portion 303a. The surface identifying portion 303a receives information from the surface discriminating signal generating portion 300 and identifies a plurality of the rotatable polygonal minors. The correction data controller 303b controls, on the basis of correction data for the signal surface identified by receiving the information from the surface discriminating signal generating portion 300, drive of a laser driving portion 306 via a laser light modulating portion (image clock generating portion) 304. In this embodiment, the correction data controller 303b and the surface identifying portion 303a are managed by a CPU which is a controller for controlling an operation of the optical scanning apparatus. The image signal generating portion 305 generates an image signal and sends the image signal to the laser driving portion 306. The laser driving portion 306 causes the semiconductor laser unit 1 to output the laser light. The laser light emitted from the semiconductor laser unit 1 is reflected by the reflecting surface of the rotating rotatable polygonal mirror 4, and the reflected laser light is detected by the BD sensor 6, and thereafter, the photosensitive drum 103 is scanned with the laser light. Here, when the laser light is detected by the BD sensor 6, a BD signal is generated and outputted.

The surface discriminating signal generating portion 300 includes a scan period measuring portion, a scan period storing portion and a surface discrimination signal portion which are not shown. The rotatable polygonal mirror 4 is rotated at a constant speed, and a process of imparting a surface ID is started. In the surface discrimination signal portion assigns a surface ID to a current reflecting surface correspondingly to a BD period, and thereafter renews the surface ID corresponding to the BD signal every time when the BD signal is inputted and thus assigns the renewed surface ID to a subsequent reflecting surface.

The "current reflecting surface" refers to a reflecting surface which supplied reflected light which becomes a basis for providing the BD signal outputted immediately before. Every (one) rotation of the rotatable polygonal mirror 4, i.e., for each of outputs of the BD signals in the same number (four in this embodiment) as the reflecting surfaces, the same reflecting surface becomes a supply source of the reflected light. In this embodiment, each BD signal outputted once per four times corresponds to a certain reflecting surface. Accordingly, the surface ID is not only information for identifying each of the reflecting surfaces but also discriminates each of the BD signals in (one) rotation of the rotatable polygonal mirror 4.

In the scan period measuring portion, an internal counter periods the "BD period", which is an output interval of the BD signal, as an output interval for each reflecting surface. Accordingly, the BD period is measured in the number of times corresponding to the number of the reflecting surfaces of the rotatable polygonal minor 4. Then, the BD periods of the respective reflecting surfaces are stored in the scan period storing portion in the order of measurement. The BD periods of the reflecting surfaces stored in this scan period storing portion are measured data each measured as the output interval for each (associated) reflecting surface. The reflecting surface which is first measured and which corresponds to the BD signal on a side of a start of the BD period is not determined but can be different every time.

For example, as shown in part (a) of FIG. 4, in the case where a rotational frequency (the number of revolutions) of the rotatable polygonal mirror 4 is r1 and the rotatable polygonal mirror 4 has four reflecting surfaces, the reflecting surface being in a position where after a step of assigning the surface ID is started, the laser light is reflected immediately after a first BD signal is outputted is a first surface. In this case, in the surface discrimination signal portion, the surface ID is assigned as "ID11" to the first surface. When a subsequent (second) BD period is inputted, an interval between itself and the first BD signal is measured by the scan period measuring portion, and the measured interval is stored as a BD period (for example, β11) of the first surface in the scan period storing portion.

Then, when a subsequent (third) BD signal is inputted, an interval between itself and the second BD signal immediately before the third BD signal is measured as a BD period of a subsequent (second) surface, and the BD period (for example, β12) is stored in the scan period storing portion, and in addition, as the surface ID, "ID12" is assigned to the second surface. Such a process is carried out in the number of times corresponding to the number of the reflecting surfaces of the rotatable polygonal mirror 4 for each of two rotational frequencies consisting of a first rotational frequency r1 and a second rotational frequency r2 larger than the first rotational frequency r1. Then, for each rotational frequency, BD periods β (β11 to β14, β21 to β24) are stored in the scan period storing portion, and at the same time, surface IDs (ID11 to ID14, ID21 to ID24) are assigned to the respective reflecting surfaces. For example, in the case of the second rotational frequency r2, as shown in part (b) of FIG. 4, to the first reflecting surface, the surface ID is assigned as "ID21", and then is successively assigned in the number of times corresponding to the number of remaining reflecting surfaces. In part (b) of FIG. 6, for each of the rotational frequencies r1 and r2, a correspondence relationship between the BD period (3 stored in the scan period storing portion and the surface ID generated by the surface discrimination signal portion is shown. The BD period (3 is measured data measured as an output interval for each reflecting surface by the scan period measuring portion of the surface discriminating signal generating portion 300 and is period data associated with the surface ID by assigning the order of output to the surface ID.

The main scan position deviation correcting portion 301 includes a correction data storing portion 302 which is a storing portion, the surface identifying portion 303a for identifying a plurality of reflecting surfaces, the correction data controller 303b for reading the data and for carrying out correction control, and the laser light modulating portion (image clock generating portion) 304. Incidentally, in this embodiment, the correction data controller 303b and the surface identifying portion 303a are managed by the CPU, but constitutions of the respective portions are not limited thereto. The respective portions constituting the main scan position deviation correcting portion 301 may be realized by a dedicated circuit such as ASIC and may also be realized by a CPU, a ROM, a RAM and a computer program. In this embodiment, as described above, the CPU performing the functions of the surface identifying portion 303a and the correction data controller 303b receives the information from the surface discriminating signal generating portion 300 and identifies the surface (reflecting surface) of the rotatable polygonal mirror, and then controls the drive of the laser driving portion 306 via the laser light modulating portion (image clock generating portion) 304. The correction data storing portion 302 stores, as shown in part (a) of FIG. 6, the BD periods of the respective reflecting surfaces of the rotatable polygonal mirror 4 measured for each of a plurality of rotational frequencies in an assembling step in advance and correction data corresponding thereto in an association manner. In this embodiment, as the rotatable polygonal mirror including a plurality of reflecting surfaces, the rotatable polygonal mirror 4 including four reflecting surfaces A to D as shown in FIG. 3 is exemplified.

As shown in part (a) of FIG. 6, in the correction data storing portion 302, BD periods (a) corresponding to the reflecting surfaces A to D and correction data (data) corresponding to the reflecting surfaces A to D are stored in advance. In this embodiment, the BD periods (a) associated with the reflecting surfaces A to D, respectively, are discrimination data.

Further, the discrimination data (BD periods (a)) and the correction data (data), which correspond to the reflecting surfaces A to D, respectively, are stored in the above-described correction data storing portion 302 in advance for each of the two rotational frequencies consisting of the first rotational frequency r1 and the second rotational frequency r2 larger than the first rotational frequency r1.

That is, the correction data storing portion 302 stores BD periods $\alpha 1$ ($\alpha 11$ to $\alpha 14$) of the reflecting surfaces A to D of the rotatable polygonal mirror 4 and main scan position deviation correction data (data L1 to data L4) corresponding to the reflecting surfaces A to D, at the time of the first rotational frequency r1 in advance. The correction data (data L1 to data L4) are first correction data for correcting deviation of the laser light, on the photosensitive drum with respect to the main scan direction, reflected by the reflecting surfaces in the case where the rotatable polygonal mirror 4 is rotated at the first reflecting surface r1. Further, the correction data storing portion 302 stores BD periods $\alpha 2$ ($\alpha 21$ to $\alpha 24$) of the reflecting surfaces A to D of the rotatable polygonal mirror 4 and main scan position deviation correction data (data H1 to data H4) corresponding to the reflecting surfaces A to D, at the time of the second rotational frequency r2 in advance. The correction data (data H1 to data H4) are second correction data for correcting deviation of the laser light, on the photosensitive drum with respect to the main scan direction, reflected by the reflecting surfaces in the case where the rotatable polygonal mirror 4 is rotated at the second reflecting surface r2.

The BD periods $\alpha$ of the reflecting surfaces and the corresponding main scan position deviation correction data (data) for each rotational frequency shown in part (a) of FIG. 6 are measured using jigs and tools in an assembling step in advance. In this embodiment, in addition to the BD sensor by three scanning position detecting sensors, correction data for correcting positional deviation at three portions (image writing start portion, image center portion, image writing end portion) of the photosensitive drum 103 with respect to the main scan direction are acquired. Specific examples of the measured BD periods and corresponding correction data are shown in part (a) of FIG. 5. Incidentally, part (a) of FIG. 5, the correction data for correcting the deviation in the main scan direction of the laser light reflected by the reflecting surfaces are larger in the case of the second rotational frequency r2 (39625 rev·min$^{-1}$) than in the case of the first rotational frequency r1 (25000 rev·min$^{-1}$).

In part (a) of FIG. 6 and part (a) of FIG. 5, the BD period is a time interval from a BD signal 1 to a BD signal 2 when the BD signal 1 is acquired at one surface of the rotatable polygonal minor and then the BD signal 2 is acquired at a subsequent surface of the rotatable polygonal mirror. For example, the BD signal of the reflecting surface A of the rotatable polygonal mirror 4 shown in FIG. 3 is acquired as the BD signal 1 by the BD sensor 6. Then, the BD signal of the reflecting surface B which is a subsequent surface adjacent to the reflecting surface A with respect to a rotational direction is acquired as the BD signal 2 by the BD sensor 6. A time interval from acquisition of the BD signal 1 to acquisition of the BD signal 2 is the BD period. That is, an output interval of the signal outputted by the BD sensor 6 is the BP period. Other BD periods (time intervals) between other reflecting surfaces are also similarly acquired. Further, a correspondence relationship of the respective reflecting surfaces with the respective BD periods is acquired by associating a surface when the BD signal 1 which is a preceding signal in one BD period is acquired, with the time interval (BD period) from the BD signal 1 to the BD signal 2. For example, the time interval (BD period) from the BD signal 1 of the reflecting surface A to the BD signal 2 of the reflecting surface B which are acquired by the BD sensor 6 is associated with the reflecting surface A providing the BD signal 1 which is preceding signal. The association between another reflecting surface and another BD period is also similarly made.

On the other hand, the correction data are data for correcting the positional deviation (positional deviation amount in the main scan direction from an ideal position which is a reference position), in the main scan direction of the laser light L reflected by each reflecting surface, which generates due to surface deformation in one surface of the rotatable polygonal mirror. The positional deviation in the main scan direction of the laser light L reflected by each reflecting surface is deviation of a distance from a scanning start position to an image region (i.e., from an image writing start portion to an image writing end portion) with respect to the main scan direction. Here, as a conversion factor of the distance, a time may also be used. In this embodiment, as shown in part (b) of FIG. 5, in addition to the BD sensor 6, by three scanning position detecting sensors S1, S2 and S3, correction data for correcting the positional deviation at the three portions (the image writing start portion, the image center portion and the image writing end portion) of the photosensitive drum 103 with respect to the main scan direction are acquired. As shown in part (b) of FIG. 5, at the scanning start position, the BD sensor 6 is disposed. As regards the above-described 3 portions of the photosensitive drum with respect to the main scan direction, the sensors S1, S2 and S3 are disposed at the positions of the image writing start portion, the image center portion and the image writing end portion, respectively. With respect to the main scan direction, a symbol a represents a distance from the scanning start position to the position of the image writing start portion, a symbol b represents a distance from the scanning start position to the position of the image center portion, and a symbol c represents a distance from the scanning start position to the position of the image writing end portion. As the correction data, deviation amounts in the main scan direction from the ideal positions at the above-described 3 portions with respect to the main scan direction are stored. That is, the respective distance a, b and c are measured, and deviation amounts in the main scan direction from ideal distances which are reference distances for the measured distances a, b and c are stored in advance as correction data in the correction data storing portion 302 shown in FIG. 3. Incidentally, in the measurement by the above-described jigs and tools, arrangement and the number of the scanning position detecting sensors other than the BD sensor are not limited to those described above, but should be appropriately set as needed.

Here, the BD period α is measured in advance after each of the reflecting surfaces A to D is identified, and is a parameter corresponding to the BD period β. However, whether each of the BD periods β corresponds to which reflecting surface can change in every surface identification, and therefore, whether each of the BD periods α for which the reflecting surface is identified corresponds to which BD period β is not determined unless a process of identifying the reflecting surface described later is performed.

Measurement of the BD period α can be carried out by the same method as the BD period β, but there is no restriction on the measuring method. That is, it is assumed that the BD period α is measured in a stage before shipping of the image forming apparatus, so that it is not essential that an operation such that scanning is actually performed by rotating the rotatable polygonal mirror 4 is performed. The main scan position deviation correction data (data) (hereinafter also simply referred to as "correction data (data)" is data for correcting, during image formation, a preliminarily measured deviation amount of a scanning line with respect to the main scan direction. This data is also measured in the stage before the shipping of the image forming apparatus.

The correction data controller 303b outputs a reading address (adrs) to the correction data storing portion 302 depending on the surface ID generated by the surface discriminating signal generating portion 300. Then, the correction data controller 303b receives, from the correction data storing portion 302, correction data (data) stored in the reading address (adrs) and outputs the correction data (data) to the laser driving portion 306.

Next, an associating method between the surface ID generated by the surface discriminating signal generating portion 300 and the reading address (adrs) stored in the correction data storing portion 401 will be described.

The CPU reads, depending on the rotational frequency (r1, r2), not only the BD periods β (β11 to β14, β21 to β24) from the scan period storing portion of the surface discriminating signal generating portion 300 but also the BD periods α (α11 to α14, α21 to α24) from the correction data storing portion 302. Then, the CPU compares the read BD period β and the read BD period α with each other, and sets the reading address (adrs) of the correction data (data) in the correction data storing portion 302 for the surface ID of each reflecting surface of the rotatable polygonal minor 4.

For example, in the case where the rotational frequency of the rotatable polygonal mirror 4 is the first rotational frequency r1 and the rotatable polygonal minor 4 has the 4 surfaces (reflecting surfaces), in each of 4 kinds of combination patterns, sum of squares of differences between BD periods (β11 to β14) and BD periods (α11 to α14) is calculated in the following manner. First, when the BD signal is first outputted, the reflecting surface being in a position where the laser light is reflected is arbitrarily determined. This arbitrarily determined reflecting surface is taken as the first surface (surface ID=ID1), and then, the respective reflecting surfaces sequenced in the appearing order along the rotational direction of the rotatable polygonal mirror 4 and the reflecting surfaces sequenced in advance in the order from the A surface are combined with each other, so that a first combination pattern is formed.

With respect to respective pairs (in this embodiment, a pair of the first surface and the A surface, a pair of the second surface and the B surface, a pair of the third surface and the C surface, and a pair of the fourth surface and the D surface), a process of calculating a square of a difference between the BD period β and the BD period α is carried out. Then, when the combination pattern is changed by shifting the preliminarily sequenced reflecting surfaces one by one, 4 kinds (corresponding to the number of the reflecting surfaces of the rotatable polygonal mirror) of combination patterns are formed. In each of the pairs in each of all these 4 combination patterns, the above-described process of calculating the square of the difference between the pair is performed. For example, in the second combination pattern, the square of the difference between the pair is calculated for each of the pair of the first surface and the B surface, the pair of the second surface and the C surface, the pair of the third surface and the D surface, and the pair of the fourth surface and the A surface. In the third combination pattern, the square of the difference between the pair is calculated for each of the pair of the first surface and the C surface, the pair of the second surface and the D surface, the pair of the third surface and the A surface, and the pair of the fourth surface and the B surface. In the fourth combination pattern, the square of the difference of the pair is calculated for each of the pair of the first surface and the D surface, the pair of the second surface and the A surface, the pair of the third surface and the B surface, and the pair of the fourth surface and the C surface.

Then, in each of all the combination patterns, the sum of square of differences between the pairs (i.e., the sum of squares) is acquired, so that resultant values are difference values. Difference values 1 to 4 of combination patterns 1 to 4 are specifically calculated by the following calculation formulas.

$(\beta 11-\alpha 11)^2+(\beta 12-\alpha 12)^2+(\beta 13-\alpha 13)^2+(\beta 14-\alpha 14)^2$=difference value 1   Pattern 1:

$(\beta 11-\alpha 12)^2+(\beta 12-\alpha 13)^2+(\beta 13-\alpha 14)^2+(\beta 14-\alpha 11)^2$=difference value 2   Pattern 2:

$(\beta 11-\alpha 13)^2+(\beta 12-\alpha 14)^2+(\beta 13-\alpha 11)^2+(\beta 14-\alpha 12)^2$=difference value 3   Pattern 3:

$(\beta 11-\alpha 14)^2+(\beta 12-\alpha 11)^2+(\beta 13-\alpha 12)^2+(\beta 14-\alpha 13)^2$=difference value 4   Pattern 4:

Incidentally, when the combination pattern is changed, there is no restriction on the order of changing the combination between the BD period α and the BD period β. For example, in the above-described calculation formulas, relative to the BD period β, the BD period α is shifted one by one, but relative to the BD period α, the BD period β may also be shifted one by one.

Part (a) of FIG. 6 is a table showing an example of the BD periods (α11 to α14, α21 to α24), for each rotational frequency, stored in advance in the correction data storing portion 302. Part (b) of FIG. 6 is a table showing an example of the BD periods (β11 to β14, β21 to β24), for each rotational frequency, measured and stored in the scan period storing portion of the surface discriminating signal generating portion 300.

Here, of the 4 combination patterns, by the combination pattern in which the difference value is a minimum value, correspondence of each of the BD periods α in the correction data storing portion with associated one of the BD periods β in the scan period storing portion of the surface discriminating signal generating portion 300 is determined. At that time, a certain threshold is set, and satisfaction of a matching condition such that "the minimum difference value is the threshold or less and all the difference values other than the minimum difference value are larger than the same threshold" is discriminated. Only in the case where this matching condition is satisfied, discrimination that association (pattern match (matching)) of each of the BD periods α in the correction data storing portion 302 with the associated one of the BD periods β in the scan period storing portion of the surface discriminating signal generating portion 300 was succeeded is made.

Here, in the surface discriminating signal generating portion 300, the surface ID and the BD period β are associated with each other (part (b) of FIG. 6). In the correction data storing portion 302, the reading address (adrs) in which the correction data (data) is stored and the BD period α are associated with each other, and the BD period α and the correction data (data) have a correspondence relationship therebetween through the reading address (adrs) (part (a) of FIG. 6). Incidentally, in each of parts (a) and (b) of FIG. 7, for associated one of the rotation frequencies, a correspondence relationship in the case where of the above-described 4 combination patterns, the combination pattern in which the difference value 4 is the minimum value is shown as an example.

In the case where the pattern match is succeeded, on the basis of one-to-one correspondence relationship between the BD period β and the BD period α in the combination pattern, of the CD (data) in the correction data storing portion 302, the CD (data) corresponding to the surface ID of each reflecting surface is used for correcting the main scan position deviation. That is, in the order of the surface ID, the BD period β, the BD period α and the reading address (adrs), the reading address (adrs) corresponding to the surface ID is acquired (FIG. 7). Then, the correction data (data) stored in this reading address (adrs) is read out as the correction data used in the main scan position deviation correction.

The correspondence relationship between the BD period β and the BD period α becomes known, and therefore, whether the reflecting surface currently reflecting the laser light is which reflecting surface in actuality also becomes known. That is, in a stage in which surface identification is not completed, the surface ID is merely assigned to each of the reflecting surfaces of the rotatable polygonal mirror 4, so that an absolute position of each of the reflecting surfaces is not known in actuality. However, after the surface identification is completed, each of the plurality of reflecting surfaces of the rotatable polygonal mirror 4 is identified. For that reason, from the correspondence relationship with the BD signals, an identification result as to whether each of the reflecting surfaces is the reflecting surface reflecting the laser light or is the rotational frequency being in which position relative to the reflecting surface reflecting the laser light is acquired. In this embodiment, this matching process is performed by the surface identifying portion, so that the 4 reflecting surfaces of the rotatable polygonal mirror can be identified by the process in the surface identifying portion, but a reflecting surface identifying method is not limited to this method. When only one reflecting surface can be identified, it is possible to correct the deviation in the main scan direction for the identified surface by the correction data.

Incidentally, in the case where the pattern match failed, the correction data in the correction data storing portion 302 is not set. In this embodiment, in the case where the pattern match failed, a process in which the correction data is not set was described as an example, but the present invention is not limited thereto. For example, even in the case where the pattern match failed, an average of the correction data (data) in the correction data storing portion 302 is set as common correction data for all the reflecting surfaces. Here, the same (common) correction data may also be predetermined correction data, not the average.

In the case where the pattern match was succeeded, the minimum difference value approaches zero without limit. Therefore, as a manner of determining a threshold T in the above-described matching condition, it is desirable that in the case where the pattern match was succeeded, a value of an error calculated from a rotation jitter or the like of the rotatable polygonal mirror is set.

For example, in the case where the difference value of 4 which is the minimum difference value is the threshold T or less and the difference values of 1, 2 and 3 other than the minimum difference value of 4 are larger than the threshold T, the case is regarded as the case where the pattern match was succeeded.

On other hand, in the case where all the difference values are larger than the threshold T, the case is regarded as the case where the pattern match failed. This case can occur in the case where the BD period of a certain reflecting surface was not able to be correctly measured in the scan period storing portion of the surface discriminating signal generating portion 300 due to a cause such that noise generates in the BD signal or in the like case.

For example, in the case where the difference value of 4 is the minimum value at the rotational frequency r1 and the pattern match was succeeded, as shown in part (a) of FIG. 7, the BD period in the correction data storing portion 302 corresponding to the BD period β11 in the scan period storing portion of the surface discriminating signal generating portion 300 is the BD period α14. A change pattern of the BD periods β starting from the reflecting surface (surface ID: ID11) corresponding to the BD period β11 in part (b) of FIG. 6 and a change pattern of the BD periods α starting from the reflecting surface (D surface) corresponding to the BD period α14 in part (a) of FIG. 6 most approximate to each other. Consequently, the pattern match also identifies starting points (reflecting surfaces) of the BD periods so that the change pattern of the BD periods β and the change pattern of the BD periods α coincide with each other.

In this case, as shown in part (a) of FIG. 7, for the ID11 which is the surface ID corresponding to the BD period β11, "adrs 14" is set as the reading address (adrs) in the correction data storing portion 302 of the main scan direction deviation correcting portion 301. In the positional deviation correction, the correction data (data L4) stored in the reading address (adrs 14) is read and is used as the correction data. Incidentally, the case where the difference value of 4 is the minimum value at the rotational frequency r2 and the pattern match was succeeding is shown as an example in part (b) of FIG. 7.

Thus, when correspondence between the surface ID and the reading address adrs in the correction data storing portion 302 is determined, for each of the rotational frequencies, it is possible to read and use the correction data (data) corresponding to the current reflecting surface of the rotatable polygonal mirror 4, depending on each surface ID. That is, it is possible to read and use the first correction data in the case where the rotatable polygonal mirror 4 was rotated at the first rotational frequency r1 stored in advance in the correction data storing portion 302 or in the case where the rotatable polygonal mirror 4 was rotated at the second rotational frequency r2 stored in advance in the correction data storing portion 302. The correspondence relationship among the BD signal, the surface ID and the correction data is shown in part (a) of FIG. 8 showing the case of the rotational frequency r1 and the difference value of 4 and in part (b) of FIG. 8 showing the case of the rotational frequency r2 and the difference value of 4. In the positional deviation correction, in the laser driving portion 306, emission of the laser light is controlled depending on the read correction data (data). That is, the CPU controls, depending on the read correction data (data) (the first correction data or the second correction data), the emission of the laser light from the semiconductor laser unit 1 which is the light source, through the laser storing portion 306. As a result, the positional deviation, in the main scan direction of the laser light reflected by each of the reflecting surfaces, generating for each of the rotational frequencies of the rotatable polygonal mirror can be corrected with reliability, so that it is possible to suppress a deterioration of an image quality due to the positional deviation.

Next, identification of the reflecting surface by the CPU having the functions as the surface identifying portion 303a and the correction data controller 303b, and a control process of the positional device correction of the identified reflecting surface in the main scan direction will be described. FIG. 9 is a flowchart of the process of identifying the reflecting surface and of correcting the main scan direction deviation.

First, in step S101, the CPU discriminates whether or not image formation is started, and causes the process to go to step S102 when the image formation is started, and discriminates the rotational frequency of the rotatable polygonal mirror 4 with operations in various printing modes. The image forming apparatus is operable in the various printing modes, and is changed in printing speed depending on a kind of paper subjected to printing, for example. In this case, the change in printing speed is met by changing the rotational frequency of the rotatable polygonal mirror in the deflector. For example, the kind of paper is detected by a signal from a sensor (not illustrated) which is a detecting portion for detecting the kind of the recording material, and depending on the detection result, the printing speed (the rotational frequency of the rotatable polygonal minor) is changed. Specifically, in the case where the recording material is thick paper, compared with the case where the recording material is plain paper thinner than the thick paper, the printing speed is made slow, so that the rotational frequency of the rotatable polygonal mirror is made slow (small). Accordingly, in the case where the recording material is the thick paper, the rotational frequency is the first rotational frequency r1, and in the case where the recording material is the plain paper, the rotational frequency is the second rotational frequency r2 faster (larger) than the first rotational frequency r1. In this embodiment, as the plurality of rotational frequencies of the rotatable polygonal mirror, the case of the first rotational frequency r1 and the second rotational frequency r2 faster than the first rotational frequency r1 was described as an example, but the plurality of rotational frequencies are not limited thereto. The plurality of rotational frequencies should be appropriately set depending on the printing speed and the kind of paper.

Then, the CPU causes the process to go to step S103 when the rotational frequency of the rotatable polygonal mirror 4 is the first rotational frequency r1. In the step S103, the CPU not only measures the BD periods $\beta1$ ($\beta11$ to $\beta14$) of the respective reflecting surfaces of the rotatable polygonal mirror 4 depending on the first rotational frequency r1 by the surface discriminating signal generating portion 300 but also controls the surface discriminating signal generating portion 300 to store the measured BD periods $\beta1$ in the scan period storing portion. Then, when the measurement of the BD periods $\beta1$ is completed for all the reflecting surfaces of the rotatable polygonal mirror 4, the CPU causes the process to go to step S104. In the step S104, the CPU reads from the scan period storing portion of the surface discriminating signal generating portion 300, the BD periods $\beta1$ of the reflecting surfaces of the rotatable polygonal minor 4 depending on the first rotational frequency r1.

Next, in step S105, the CPU reads, from the correction data storing portion 302, the BD periods $\alpha1$ ($\alpha11$ to $\alpha14$) of the reflecting surfaces of the rotatable polygonal minor 4 depending on the first rotational frequency r1. Then, in step S106, the CPU calculates, from the above-read BD periods $\beta1$ and the above-read BD periods $\alpha1$ of the reflecting surfaces depending on the first rotational frequency r1, difference values in the respective combination patterns corresponding to the number of the reflecting surfaces of the rotatable polygonal minor 4. For example, in the case where the rotatable polygonal mirror 4 has 4 reflecting surfaces, there are four combination patterns of the BD periods, so that difference values 1 to 4 are calculated.

Next, in step S107, the CPU not only carries out the pattern match between the BD period $\alpha1$ and the BD period $\beta1$ depending on the first rotational frequency r1 in accordance with the above-described matching condition but also discriminates whether or not the pattern match was succeeded. As a result, in the case where the pattern match was succeeded, the CPU causes the process to go to step S108.

In the step S108, the CPU identifies the combination pattern providing the minimum difference value in the case where the rotational frequency of the rotatable polygonal minor 4 in the first rotational frequency r1 and grasps one-to-one correspondence relationship between the BD period $\beta1$ and the BD period $\alpha1$ in that combination pattern. That is, the pattern match is succeeded and the combination pattern providing the minimum difference value is identified, so that the correspondence relationship between the BD period $\beta$ with which the surface ID is associated and the BD period $\alpha$ associated with the each rotational frequency in advance is identified, and thus the respective reflecting surfaces of the rotatable polygonal minor 4 are identified. Then, the CPU follows the correspondence relationship as described above and sets the reading addresses (adrs) in the correction data storing portion 302 for the respective surface IDs (FIG. 7).

Then, in step S109, the CPU reads, from the correction data storing portion 302, the correction data (data) stored in the reading addresses (adrs) set for the surface IDs. In this embodiment, in the case where the rotational frequency of the rotatable polygonal mirror 4 is the first rotational frequency r1, the CPU reads the above-described correction data (data) (first correction data) from the correction data storing portion 302.

Then, in subsequent step S110, the CPU controls, depending on the read correction data (data) (first correction data), emission of the laser light from the semiconductor laser unit 1 which is the light source, through the laser driving portion 306, and carries out the image formation. Specifically, the CPU controls the read correction data (data) (first correction data) so as to be outputted to the laser light modulating portion (image clock generating portion) 304.

In the laser light modulating portion (image clock generating portion) 304, on the basis of the main scan position deviation correction data (data), image clock modification is performed for each of scanning lines for the respective reflecting surfaces of the rotatable polygonal mirror 4, so that the main scan position deviation correction is made.

The laser light modulating portion (image clock generating portion 304 supplies, to the laser driving portion 306, image clocks modified on the basis of the rotational frequency and the correction data depending on the identified reflecting surface. The image signal generating portion 305 generates an image signal and supplies the image signal to the laser driving portion 306. The laser driving portion 306 outputs the laser light from the semiconductor laser unit 1 in accordance with the supplied image signal and the image clocks generated by the main scan position deviation correcting portion 301, and carries out the image formation. Then, in step S111, the CPU discriminates whether or not the image formation is ended, and when the image formation is ended, the CPU ends the control process.

On the other hand, in the case where the pattern match failed in the above-described step S107, the CPU causes the process to go to step S110. In the step S110, the CPU does not set the correction data. Incidentally, in this embodiment, the control process in which the correction data is not set in the case where the pattern match failed was described as an example, but the present invention is not limited thereto. For example, even in the case where the pattern match failed, the control process may also be carried out in the following manner. That is, an average of the correction data (data) in the correction data storing portion 302 is set as common correction data to all the reflecting surfaces. Then, the same correction is made to the laser light for each of the reflecting surfaces of the rotatable polygonal mirror 4. The control process may also be carried out in such a manner.

Further, in the above-described step S102, when the rotational frequency of the rotatable polygonal mirror 4 with the operation in each of the various printing modes is discriminated, the CPU causes the process to go to step S113 if the rotational frequency of the rotatable polygonal minor 4 is the rotational frequency r2. Processes from step S113 to step S120 are similar to those from the above-described step S103 to the above-described step S110 except that the rotational frequency and data such as the BD periods for that rotational frequency are different, and therefore will be omitted from description in this embodiment.

Further, when the above-described rotational frequency (second rotational frequency r2) and the correction data (second correction data) for each of the reflecting surfaces of the rotatable polygonal minor are set depending on the above-identified reflecting surface, in the subsequent step S111, the CPU carries out the image formation as described above. In a step S112, the CPU discriminates whether the image formation is ended or not, and when the image formation is ended, the CPU ends the control process in this embodiment.

By making the above-described main scan position deviation correction, it is possible to suppress the deterioration of the image quality due to the above-described positional deviation in the main scan direction. Further, by making the above-described positional deviation correction, a maximum deviation amount from ideal positions at the image writing start portion, the image center portion and the image writing end portion can be made not more than a predetermined value (in this embodiment, not more than about 5 µm). Further, a relative deviation amount among the reflecting surfaces of the rotatable polygonal mirror 4 can be made not more than about 3 µm. Incidentally, in this embodiment, the case where the two rotational frequencies of the rotatable polygonal mirror 4 are used was described, but even in the case of using three or more rotational frequencies, a similar function can be obtained when main scan direction deviation correction data depending on the respective rotational frequencies are stored in advance in the correction data storing portion 302.

Further, the case where the material of the rotatable polygonal mirror 4 is the resin material such as the polycarbonate resin or the cycloolefin resin was described, but is not limited thereto. Even in the case where the material of the rotatable polygonal mirror 4 is a metal material such as aluminum, a deformation amount of the reflecting surface due to the rotation of the rotatable polygonal mirror 4 is not completely zero. For that reason, even in the case where the material of the rotatable polygonal mirror 4 is the metal material, similar correction data are acquired for each of the rotational frequencies, and then the main scan position deviation correction may also be carried out for each of the rotational frequencies.

Thus, by storing the positional correction data in the main scan direction for each of the rotational frequencies of the rotatable polygonal mirror used in the image forming apparatus, it is possible to reliably correct the main scan direction positional deviation, of the laser light reflected by each of the reflecting surfaces, generating for each of the rotational frequencies of the rotatable polygonal mirror 4. Accordingly, even when the rotational frequency of the rotatable polygonal mirror 4 of the image forming apparatus is changed, the deterioration of the image quality is not caused to occur, so that a high-quality image can be maintained.

Next, another embodiment in which scanning line positional deviation due to a temperature of an inside of the image forming apparatus will be described.

When a temperature of an inner space of the image forming apparatus changes, the reflecting surfaces of the rotatable polygonal mirror are deformed due to thermal deformation. Part (b) of FIG. 23 is a numerical value simulation result of reflecting surface deformation when a rotatable polygonal minor 51 constituted by four reflecting surfaces 51A to 51D shown in part (a) of FIG. 23 installed in a high-temperature environment. As the material of the rotatable polygonal minors, a cycloolefin polymer (COP) is used and the simulation in the case where the temperature is increased by 440K was performed.

The ordinate of a graph shown in part (b) of FIG. 11 represents a deformation amount of the reflecting surface with respect to a direction perpendicular to the reflecting surface shown in part (a) of FIG. 23. In part (b) of FIG. 23, the deformation amount of the reflecting surface, with respect to the direction perpendicular to the reflecting surface, from the reflecting surface center to the end of the reflecting surface is shown. Incidentally, in part (a) of FIG. 23, the dimension l of the reflecting surface of the rotatable polygonal minor is about 14 mm, and therefore, a length l/2 from the reflecting surface center to the end of the reflecting surface is about 7 mm.

As shown in part (b) of FIG. 23, from a result of the simulation, deformation in an amount of about 550 nm generates from the reflecting surface center to the end of the reflecting surface with respect to the main scan direction. In general, as regards flatness of the reflecting surface, $\lambda/5/\lambda$ (wavelength of red light)=632.8 nm) is needed. Accordingly, thermal deformation of the rotatable polygonal mirror in this numerical value simulation is a large deformation amount from an optical viewpoint. Incidentally, linear expansion coefficient of aluminum conventionally used as the material of the rotatable polygonal mirror is about ⅓ of that of COP, so that also in the case of aluminum, the thermal deformation has not some little influence optically.

FIG. 24 is a graph showing a change in scanning time of the respective reflecting surfaces of the rotatable polygonal minor when a temperature of a space in which the rotatable polygonal mirror is installed is changed. In FIG. 24, the case of the rotatable polygonal minor having 4 reflecting surfaces is shown as an example. In FIG. 24, a chain line shows the change in scanning time of the reflecting surfaces in the case where the temperature is 20° C., a broken line shows the change in scanning time of the reflecting surfaces in the case where the temperature is 60° C. higher than 20° C., and a solid line shows the change in scanning time of the reflecting surfaces in the case where the temperature is 0° C. lower than 20° C. As is understood from FIG. 24, a change amount of the scanning time relative to a change in temperature is different for each of the reflecting surfaces. This is caused by anisotropy of the material of the rotatable polygonal minor and a supporting method of the rotatable polygonal mirror.

FIG. 25 shows a result of measurement of a scanning time jitter in a certain section of laser light which is reflected by each reflecting surface and which is then subjected to deflection scanning when the rotatable polygonal minor made of the plastic in actually rotated in each of temperature environments shown in FIG. 24. The ordinate shown in FIG. 25 is the scanning time jitter and principally represents a jitter amount due to the flatness of each reflecting surface. In this case, the jitter amount (scanning time jitter is represented by a percentage obtained by dividing a value, obtained by subtracting a minimum from a maximum of a scanning time of each reflecting surface (of the 4 surfaces) of the rotatable polygonal minor, by an average scanning time. The abscissa shown in FIG. 25 is the temperature of the space in which rotatable polygonal minor is installed. From FIG. 25, it is understood that the jitter amount due to the flatness of each reflecting surface changes depending on the temperature. This tendency is conspicuous in the rotatable polygonal minor made of plastic such as COP. The temperature of the rotatable polygonal mirror changes depending on an install temperature environment of the image forming apparatus and an operation status of the image forming apparatus. When the jitter amount of the rotatable polygonal minor changes depending on the, an image forming (imaging) position on the photosensitive drum with respect to the main scan direction deviates.

In the case where the rotatable polygonal minor includes 4 surfaces, when a periodical positional deviation is generated by the 4 scanning lines, there is a liability that moire appears in an image.

[Correction of Positional Deviation of Each Reflecting Surface with Respect to Main Scan Direction Depending on Temperature Change of Rotatable Polygonal Mirror 4]

Next, using the drawings, a correcting method of a jitter amount of each reflecting surface with respect to the main scan direction depending on the temperature change of the rotatable polygonal mirror 4 (i.e., positional deviation of scanning line of each reflecting surface with respect to the main scan direction) will be described. FIG. 13 is a block diagram showing a mechanism for correcting a positional amount of scanning line with respect to the main scan direction in another embodiment. FIG. 14 is a time-series diagram showing an example of association between a surface ID and a BD (cyclic) period β measured at a scan period measuring portion. Parts (a) of FIG. 15 is a table showing a specific example of a rotational frequency, the BD period and correction data for each reflecting surface of the rotatable polygonal mirror, which are stored in a correction data storing portion in this embodiment, and part (b) of FIG. 15 is a schematic view showing a structure for measuring the BD period of each reflecting surface of the rotatable polygonal mirror and the correction data corresponding thereto. Part (a) of FIG. 16 is a table showing an example of a BD period α, a corresponding reflecting surface and corresponding correspond, which are stored in the correction data storing portion, and part (b) of FIG. 16 is a table showing an example of the BD period β and a surface ID of a corresponding reflecting surface, which are measured and stored in a scan period storing portion. FIG. 17 is a table showing an example an association relationship among the surface ID and the BD period β at a surface discriminating signal generating portion, and the BD period α in the correction data storing portion in the case of succeeding in pattern match. FIG. 18 is a time-series diagram each showing an example of association among the surface ID, the BD period β measured at the scan period measuring portion, and the correction data stored in the correction data storing portion.

As shown in FIG. 13, in this mechanism, the surface discriminating signal generating portion 300, a main scan position (magnification) deviation correcting portion 301, an image signal generating portion 305 and a temperature detecting portion 308 are included.

First, the temperature detecting portion (temperature sensor) 308 in this embodiment will be described using FIG. 20. An image forming apparatus 110 includes the temperature detecting portion 308, provided inside the image forming apparatus 110, for detecting a temperature of an inside space in which the rotatable polygonal mirror is installed. Conventionally, the temperature detecting portion is installed for estimating a rise time of the image forming apparatus and for controlling a fixing device 108. The temperature detecting portion 308 is installed in the neighborhood of a casing of the image forming apparatus being away from a control board and the fixing device 108 in general. A detection result of this temperature detecting portion 308 is used for correcting positional deviation of scanning lines in the main scan direction.

As shown in FIG. 13, the main scan direction deviation correcting portion 301 includes a correction data controller 303b relating to control and a surface identifying portion 303a. The surface identifying portion 303a receives information from the surface discriminating signal generating portion 300 and identifies a plurality of surfaces of the rotatable polygonal mirror. The correction data controller 303b controls, on the basis of correction data for the signal surface identified by receiving the information from the surface discriminating signal generating portion 300, drive of a laser driving portion 306 via a laser light modulating portion (image clock generating portion) 304. Further, in this embodiment, the correction data controller 303b and the surface identifying portion 303a are managed by a CPU which is a controller for controlling an operation of the optical scanning apparatus. The image signal generating portion 305 generates an image signal and sends the image signal to the laser driving portion 306. The laser driving portion 306 causes the semiconductor laser unit 1 to output the laser light. The laser light emitted from the semiconductor laser unit 1 is reflected by the reflecting surface of the rotating rotatable polygonal mirror 4, and the reflected laser light is detected by the BD sensor 6, and thereafter, the photosensitive drum 103 is scanned with the laser light. Here, when the laser light is detected by the BD sensor 6, a BD signal is generated and outputted.

Incidentally, the above-described correction data for the identified surface is main scan position deviation correction data for the reflecting surface at normal temperature. Although described later, the correction data controller 303b corrects the above-described correction data for the identified surface by using temperature correction data depending on a temperature change. The temperature correction data for correcting the correction data depending on the temperature change will be described later.

The surface discriminating signal generating portion 300 includes a scan period measuring portion, a scan period storing portion and a surface discrimination signal portion which are not shown. The rotatable polygonal minor 4 is rotated at a constant speed, and a process of imparting a surface ID is started. In the surface discrimination signal portion assigns a surface ID to a current reflecting surface correspondingly to a BD period, and thereafter renews the surface ID corresponding to the BD signal every time when the BD signal is inputted and thus assigns the renewed surface ID to a subsequent reflecting surface.

The "current reflecting surface" refers to a reflecting surface which supplied reflected light which becomes a basis for providing the BD signal outputted immediately before. Every (one) rotation of the rotatable polygonal minor 4, i.e., for each of outputs of the BD signals in the same number (four in this embodiment) as the reflecting surfaces, the same reflecting surface becomes a supply source of the reflected light. In this embodiment, each BD signal outputted once per four times corresponds to a certain reflecting surface. Accordingly, the surface ID is not only information for identifying each of the reflecting surfaces but also discriminates each of the BD signals in (one) rotation of the rotatable polygonal minor 4.

In the scan period measuring portion, an internal counter periods the "BD period", which is an output interval of the BD signal, as an output interval for each reflecting surface. Accordingly, the BD period is measured in the number of times corresponding to the number of the reflecting surfaces of the rotatable polygonal minor 4. Then, the BD periods of the respective reflecting surfaces are stored in the scan period storing portion in the order of measurement. The BD periods of the reflecting surfaces stored in this scan period storing portion are measured data each measured as the output interval for each (associated) reflecting surface. The reflecting surface which is first measured and which corresponds to the BD signal on a side of a start of the BD period is not determined but can be different every time.

For example, as shown in FIG. 1, in the case where and the rotatable polygonal mirror 4 has four reflecting surfaces, the reflecting surface being in a position where after a step of assigning the surface ID is started, the laser light is reflected immediately after a first BD signal is outputted is a first surface. In this case, in the surface discrimination signal portion, the surface ID is assigned as "ID1" to the first surface. When a subsequent (second) BD period is inputted, an interval between itself and the first BD signal is measured by the scan period measuring portion, and the measured interval is stored as a BD period (for example, β11) of the first surface in the scan period storing portion.

Then, when a subsequent (third) BD signal is inputted, an interval between itself and the second BD signal immediately before the third BD signal is measured as a BD period of a subsequent (second) surface, and the BD period (for example, β2) is stored in the scan period storing portion, and in addition, as the surface ID, "ID2" is assigned to the second surface. Such a process is carried out in the number of times corresponding to the number of the reflecting surfaces of the rotatable polygonal mirror 4. Then, BD periods β (β1 to β4) are stored in the scan period storing portion, and at the same time, surface IDs (ID1 to ID4) are assigned to the respective reflecting surfaces. In part (b) of FIG. 16, a correspondence relationship between the BD period β stored in the scan period storing portion and the surface ID generated by the surface discrimination signal portion is shown. The BD period β is measured data measured as an output interval for each reflecting surface by the scan period measuring portion of the surface discriminating signal generating portion 300 and is period data associated with the surface ID by assigning the order of output to the surface ID.

The main scan position deviation correcting portion 301 includes a correction data storing portion 302 which is a storing portion, the surface identifying portion 303a for identifying a plurality of reflecting surfaces, the correction data controller 303b for reading the data and for carrying out correction control, and the laser light modulating portion (image clock generating portion) 304. Incidentally, in this embodiment, the correction data controller 303b and the surface identifying portion 303a are managed by the CPU, but constitutions of the respective portions are not limited thereto. The respective portions constituting the main scan position deviation correcting portion 301 may be realized by a dedicated circuit such as ASIC and may also be realized by a CPU, a ROM, a RAM and a computer program. In this embodiment, as described above, the CPU performing the functions of the surface identifying portion 303a and the correction data controller 303b receives the information from the surface discriminating signal generating portion 300 and identifies the surface (reflecting surface) of the rotatable polygonal mirror, and then controls the drive of the laser driving portion 306 via the laser light modulating portion (image clock generating portion) 304. The correction data storing portion 302 stores, as shown in part (a) of FIG. 16, the BD periods of the respective reflecting surfaces of the rotatable polygonal mirror 4 measured in an assembling step in advance and deviation correction data corresponding thereto in an association manner. In this embodiment, as the rotatable polygonal mirror including a plurality of reflecting surfaces, the rotatable polygonal mirror 4 including four reflecting surfaces A to D as shown in FIG. 13 is exemplified.

As shown in part (a) of FIG. 16, in the correction data storing portion 302, BD periods (a) corresponding to the reflecting surfaces A to D, deviation correction data (data) corresponding to the reflecting surfaces A to D at normal temperature, and correction parameters are stored in advance. In this embodiment, the BD periods (a) associated with the reflecting surfaces A to D, respectively, are discrimination data.

Further, the discrimination data (BD periods (a)) corresponding to the reflecting surfaces A to D, the correction data (data), corresponding to the reflecting surfaces A to D at normal temperature, and the correction parameters are stored in the above-described correction data storing portion 302 in advance. That is, the correction data storing portion 302 stores BD periods α1 (α1 to α4) of the reflecting surfaces A to D of the rotatable polygonal mirror 4 and main scan position deviation correction data (data L1 to data L4) corresponding to the reflecting surfaces A to D at normal temperature, and correction parameters x and z in advance.

Further, the above-described main scan position deviation correction data and correction data corresponding to the reflecting surfaces A to D at normal temperature, and therefore, there is a need to correct the main scan position deviation correction data depending on the temperature change of the space in which the rotatable polygonal mirror is installed. In this embodiment, in order to correct, depending on the temperature change, the deviation correction data stored in the correction data storing portion 302, a device installing space temperature in the apparatus in which the rotatable polygonal mirror is installed and an operating ratio of the deflector are used. The correction parameters x (x1, x2, x3, x4) are parameters for using the above-described device installing space temperature as temperature correction data. The correction parameters z (z1, z2, z3, z4) are parameters for using the operating ratio of the deflector as temperature correction data. In this embodiment, the normal temperature is 25° C. Further, the device installing space temperature is a temperature difference from the normal temperature. For this reason, the deviation correction data, corresponding to the reflecting surfaces, stored in advance in the correction data storing portion 302 are values acquired at the normal temperature (25° C.), so that the device installing space temperature is 0° C. Further, the controller of the deflector at the time of acquiring the deviation correction data, corresponding to the reflecting surfaces, stored in advance in the correction data storing portion 302 is 0%. By using these correction parameters x and z, the temperature correction data for correcting the deviation correction data corresponding to the respective reflecting surfaces A to D are acquired by the following formula 1.

Temperature correction data=($x1,x2,x3,x4$)×(device installing space temperature)+($z1,z2,z3,z4$)×(deflector operating ratio)     [Formula 1]

In the case where the device installing space temperature is 30° C. which is the temperature difference from the normal temperature (25° C. in this embodiment) and the deflector operating ratio is 50%, the temperature correction data shown in part (a) of FIG. 15 are values acquired by the above-described formula 1. For example, the temperature correction data for the reflecting surface A is 0.52×30+3.3× 0.5≈17.3. Other temperature correction data for the reflecting surfaces B, C and D can be similarly acquired by the above-described formula 1.

Incidentally, the device installing space temperature of the inside of the apparatus in which the rotatable polygonal mirror is installed is detected by the temperature detecting portion 308 provided inside the image forming apparatus. As regards the deflector operating ratio, the correction data controller 303b counts a time of receiving the BD signal from the BD sensor and detects a ratio of an operating time of the deflector in a predetermined time.

The BD periods α of the reflecting surfaces and the corresponding main scan position deviation correction data (data) for each rotational frequency shown in part (a) of FIG. 16 are measured using jigs and tools in an assembling step in advance. Further, the correction parameters x and z are determined through measurement at respective temperatures by using the jigs and tools in advance in an experiment or the like, not in the assembling step. Further, in this embodiment, in addition to the BD sensor by three scanning position detecting sensors, correction data for correcting positional deviation at three portions (image writing start portion, image center portion, image writing end portion) of the photosensitive drum 103 with respect to the main scan direction are acquired. Specific examples of the measured BD periods, corresponding correction data and the correction parameters are shown in part (a) of FIG. 15.

In part (a) of FIG. 16 and part (a) of FIG. 15, the BD period is a time interval from a BD signal 1 to a BD signal 2 when the BD signal 1 is acquired at one surface of the rotatable polygonal mirror and then the BD signal 2 is acquired at a subsequent surface of the rotatable polygonal mirror. For example, the BD signal of the reflecting surface A of the rotatable polygonal mirror 4 shown in FIG. 3 is acquired as the BD signal 1 by the BD sensor 6. Then, the BD signal of the reflecting surface B which is a subsequent surface adjacent to the reflecting surface A with respect to a rotational direction is acquired as the BD signal 2 by the BD sensor 6. A time interval from acquisition of the BD signal 1 to acquisition of the BD signal 2 is the BD period. That is, an output interval of the signal outputted by the BD sensor 6 is the BP period. Other BD periods (time intervals) between other reflecting surfaces are also similarly acquired. Further, a correspondence relationship of the respective reflecting surfaces with the respective BD periods is acquired by associating a surface when the BD signal 1 which is a preceding signal in one BD period is acquired, with the time interval (BD period) from the BD signal 1 to the BD signal 2. For example, the time interval (BD period) from the BD signal 1 of the reflecting surface A to the BD signal 2 of the reflecting surface B which are acquired by the BD sensor 6 is associated with the reflecting surface A providing the BD signal 1 which is preceding signal. The association between another reflecting surface and another BD period is also similarly made.

On the other hand, the correction data are data for correcting the positional deviation (positional deviation amount in the main scan direction from an ideal position which is a reference position), in the main scan direction of the laser light L reflected by each reflecting surface of the rotatable polygonal mirror at the normal temperature. The positional deviation in the main scan direction of the laser light L reflected by each reflecting surface is deviation of a distance from a scanning start position to an image region (i.e., from an image writing start portion to an image writing end portion) with respect to the main scan direction. Here, as a conversion factor of the distance, a time may also be used. In this embodiment, as shown in part (b) of FIG. 15, in addition to the BD sensor 6, by three scanning position detecting sensors S1, S2 and S3, deviation correction data for correcting the positional deviation at the three portions (the image writing start portion, the image center portion and the image writing end portion) of the photosensitive drum 103 with respect to the main scan direction are acquired. As shown in part (b) of FIG. 15, at the scanning start position, the BD sensor 6 is disposed. As regards the above-described 3 portions of the photosensitive drum with respect to the main scan direction, the sensors S1, S2 and S3 are disposed at the positions of the image writing start portion, the image center portion and the image writing end portion, respectively. With respect to the main scan direction, a symbol a represents a distance from the scanning start position to the position of the image writing start portion, a symbol b represents a distance from the scanning start position to the position of the image center portion, and a symbol c represents a distance from the scanning start position to the position of the image writing end portion. As the deviation correction data, deviation amounts in the main scan direction from the ideal positions at the above-described 3 portions with respect to the main scan direction are stored. That is, the respective distance a, b and c are measured, and deviation amounts in the main scan direction from ideal distances which are reference distances for the measured distances a, b and c are stored in advance as deviation correction data in the correction data storing portion 302 shown in FIG. 13. Incidentally, in the measurement by the above-described jigs and tools, arrangement and the number of the scanning position detecting sensors other than the BD sensor are not limited to those described above, but should be appropriately set as needed.

Here, the BD period α is measured in advance after each of the reflecting surfaces A to D is identified, and is a parameter corresponding to the BD period β. However, whether each of the BD periods β corresponds to which reflecting surface can change in every surface identification, and therefore, whether each of the BD periods α for which the reflecting surface is identified corresponds to which BD period R is not determined unless a process of identifying the reflecting surface described later is performed.

Measurement of the BD period α can be carried out by the same method as the BD period β, but there is no restriction on the measuring method. That is, it is assumed that the BD period α is measured in a stage before shipping of the image forming apparatus, so that it is not essential that an operation such that scanning is actually performed by rotating the rotatable polygonal mirror 4 is performed. The main scan position deviation correction data (data) (hereinafter also simply referred to as "correction data (data)" is data for correcting, during image formation, a preliminarily measured deviation amount of a scanning line with respect to the main scan direction. This data is also assumed to be measured in the stage before the shipping of the image forming apparatus.

The correction parameters are determined through measurement at the respective temperatures by using the above-described jigs and tools in advance in the experiment or the like, not in the assembling step, and are stored in the above-described correction data storing portion 302 in advance. Incidentally, main scan magnification deviation correcting value, corresponding to the reflecting surfaces, for correcting the positional deviation, generating due to the temperature change, in the main scan direction of the laser light reflected by the reflecting surfaces of the rotatable polygonal mirror is acquired by the following formula 2.

Main scan position deviation correcting value=(temperature correction data)+(main scan position deviation correction data) [Formula 2]

The correction data controller 303b outputs a reading address (adrs) to the correction data storing portion 302 depending on the surface ID generated by the surface discriminating signal generating portion 300. Then, the correction data controller 303b receives, from the correction data storing portion 302, deviation correction data (data) stored in the reading address (adrs) and the correction parameters x and z. The temperature correction data is calculated using the correction parameters x and z, the device installing space temperature and the deflector operating ratio. By using the calculated temperature correction data and the above-described deviation correction data (data), the main scan position deviation correcting value for each surface of the rotatable polygonal mirror is calculated. That is, the main scan position deviation correcting value is correction data obtained by correcting the above-described deviation (data) by using the temperature correction data calculated depending on the temperature change. The main scan position deviation correcting value which is the correction data corrected depending on the temperature is outputted to the laser light modulating portion (image clock generating portion) 304.

Incidentally, the deviation correction data (data) corresponding to the reflecting surfaces stored in advance in the correction data storing portion 302 are values acquired at the normal temperature (25° C.) and at the deflector operating ratio of 0%. For that reason, the temperature correction data is zero at the normal temperature and at the deflector operating ratio of 0%. In another condition, a value obtained by adding the temperature correction data depending on the temperature change to the deviation correction data corresponding to the reflecting surfaces stored in advance in the correction data storing portion 302 is the main scan position deviation correcting value which is the corrected correction data.

Accordingly, in the case where the device installing space temperature is 30° C. which is the temperature difference from the normal temperature (25° C. in this embodiment) and the deflector operating ratio is 50%, the main scan position deviation correcting value corresponding to the reflecting surfaces can be acquired by the above-described formula 2 in the following manner. In the case where the device installing space temperature and the deflector operating ratio satisfy the above-described condition, the temperature correction data for the reflecting surface A is 17.3 (part (a9 of FIG. 15). For that reason, the deviation correction data (data) at the reflecting surface A is corrected to 30.3 for the image writing start portion, 79.3 for the image center portion, and 128.3 for the image writing end portion by using the above-described temperature correction data. That is, the main scan position deviation correcting value which is the corrected correction data is 30.3 for the image writing start portion, 79.3 for the image center portion and 128.3 for the image writing end portion. These values can be similarly acquired for other reflecting surfaces B, C and D. Next, an associating method between the surface ID generated by the surface discriminating signal generating portion 300 and the reading address (adrs) stored in the correction data storing portion 401 will be described.

The CPU reads not only the BD periods β (β1 to β4) from the scan period storing portion of the surface discriminating signal generating portion 300 but also the BD periods α (α1 to α4) from the correction data storing portion 302. Then, the CPU compares the read BD period β and the read BD period α with each other, and sets the reading address (adrs) of the deviation correction data (data) in the correction data storing portion 302 for the surface ID of each reflecting surface of the rotatable polygonal minor 4.

For example, in the case where the rotatable polygonal minor 4 has the 4 surfaces (reflecting surfaces), in each of 4 kinds of combination patterns, sum of squares of differences between BD periods (β1 to β4) and BD periods (α11 to α14) is calculated in the following manner. First, when the BD signal is first outputted, the reflecting surface being in a position where the laser light is reflected is arbitrarily determined. This arbitrarily determined reflecting surface is taken as the first surface (surface ID=ID1), and then, the respective reflecting surfaces sequenced in the appearing order along the rotational direction of the rotatable polygonal minor 4 and the reflecting surfaces sequenced in advance in the order from the A surface are combined with each other, so that a first combination pattern is formed.

With respect to respective pairs (in this embodiment, a pair of the first surface and the A surface, a pair of the second surface and the B surface, a pair of the third surface and the C surface, and a pair of the fourth surface and the D surface), a process of calculating a square of a difference between the BD period β and the BD period α is carried out. Then, when the combination pattern is changed by shifting the preliminarily sequenced reflecting surfaces one by one, 4 kinds (corresponding to the number of the reflecting surfaces of the rotatable polygonal mirror) of combination patterns are formed. In each of the pairs in each of all these 4 combination patterns, the above-described process of calculating the square of the difference between the pair is performed. For example, in the second combination pattern, the square of the difference between the pair is calculated for each of the pair of the first surface and the B surface, the pair of the second surface and the C surface, the pair of the third surface and the D surface, and the pair of the fourth surface and the A surface. In the third combination pattern, the square of the difference between the pair is calculated for each of the pair of the first surface and the C surface, the pair of the second surface and the D surface, the pair of the third surface and the A surface, and the pair of the fourth surface and the B surface. In the fourth combination pattern, the square of the difference of the pair is calculated for each of the pair of the first surface and the D surface, the pair of the second surface and the A surface, the pair of the third surface and the B surface, and the pair of the fourth surface and the C surface.

Then, in each of all the combination patterns, the sum of square of differences between the pairs (i.e., the sum of squares) is acquired, so that resultant values are difference values. Difference values 1 to 4 of combination patterns 1 to 4 are specifically calculated by the following calculation formulas.

$(\beta1-\alpha1)^2+(\beta2-\alpha2)^2+(\beta3-\alpha3)^2+(\beta4-\alpha4)^2=$difference value 1     Pattern 1:

$(\beta1-\alpha2)^2+(\beta2-\alpha3)^2+(\beta3-\alpha4)^2+(\beta4-\alpha1)^2=$difference value 2     Pattern 2:

$(\beta1-\alpha3)^2+(\beta2-\alpha4)^2+(\beta3-\alpha1)^2+(\beta4-\alpha2)^2=$difference value 3     Pattern 3:

$(\beta1-\alpha4)^2+(\beta2-\alpha1)^2+(\beta3-\alpha2)^2+(\beta4-\alpha3)^2=$difference value 4     Pattern 4:

Incidentally, when the combination pattern is changed, there is no restriction on the order of changing the combination between the BD period $\alpha$ and the BD period $\beta$. For example, in the above-described calculation formulas, relative to the BD period $\beta$, the BD period $\alpha$ is shifted one by one, but relative to the BD period $\alpha$, the BD period $\beta$ may also be shifted one by one.

Part (a) of FIG. 16 is a table showing an example of the BD periods ($\alpha1$ to $\alpha4$) stored in advance in the correction data storing portion 302. Part (b) of FIG. 16 is a table showing an example of the BD periods ($\beta1$ to $\beta4$) measured and stored in the scan period storing portion of the surface discriminating signal generating portion 300.

Here, of the 4 combination patterns, by the combination pattern in which the difference value is a minimum value, correspondence of each of the BD periods 6a& in the correction data storing portion with associated one of the BD periods $\beta$ in the scan period storing portion of the surface discriminating signal generating portion 300 is determined. At that time, a certain threshold is set, and satisfaction of a matching condition such that "the minimum difference value is the threshold or less and all the difference values other than the minimum difference value are larger than the threshold" is discriminated. Only in the case where this matching condition is satisfied, discrimination that association (pattern match (matching)) of each of the BD periods $\alpha$ in the correction data storing portion 302 with the associated one of the BD periods $\beta$ in the scan period storing portion of the surface discriminating signal generating portion 300 was succeeded is made.

Here, in the surface discriminating signal generating portion 300, the surface ID and the BD period $\beta$ are associated with each other (part (b) of FIG. 16). In the correction data storing portion 302, the reading address (adrs) in which the correction data (data) is stored and the BD period $\alpha$ are associated with each other. Further, the BD period $\alpha$, the correction data (data) and the correction parameter have a correspondence relationship therebetween through the reading address (adrs) (part (a) of FIG. 16). Incidentally, in FIG. 17, a correspondence relationship in the case where of the above-described 4 combination patterns, the combination pattern in which the difference value 4 is the minimum value is shown as an example.

In the case where the pattern match is succeeded, on the basis of one-to-one correspondence relationship between the BD period $\beta$ and the BD period $\alpha$ in the combination pattern, of the data stored in the correction data storing portion 302, the CD (data) corresponding to the surface ID of each reflecting surface is used for correcting the main scan position deviation. Here, the data stored in the correction data storing portion 302 are the deviation correction data (data) and the correction parameters, of which those corresponding to the surface ID of each of the reflecting surfaces are used for the main scan position deviation correction. That is, in the order of the surface ID, the BD period $\beta$, the BD period $\alpha$ and the reading address (adrs), the reading address (adrs) corresponding to the surface ID is acquired (FIG. 17). Then, the deviation correction data (data) stored in this reading address (adrs) and the correction parameter are read out as the correction data used in the main scan position deviation correction.

The correspondence relationship between the BD period $\beta$ and the BD period $\alpha$ becomes known, and therefore, whether the reflecting surface currently reflecting the laser light is which reflecting surface in actuality also becomes known. That is, in a stage in which surface identification is not completed, the surface ID is merely assigned to each of the reflecting surfaces of the rotatable polygonal mirror 4, so that an absolute position of each of the reflecting surfaces is not known in actuality. However, after the surface identification is completed, each of the plurality of reflecting surfaces of the rotatable polygonal minor 4 is identified. For that reason, from the correspondence relationship with the BD signals, an identification result as to whether each of the reflecting surfaces is the reflecting surface reflecting the laser light or is the rotational frequency being in which position relative to the reflecting surface reflecting the laser light is acquired. In this embodiment, this matching process is performed by the surface identifying portion, so that the 4 reflecting surfaces of the rotatable polygonal mirror can be identified by the process in the surface identifying portion, but a reflecting surface identifying method is not limited to this method. When only one reflecting surface can be identified, it is possible to correct the deviation in the main scan direction for the identified surface by the correction data.

Incidentally, in the case where the pattern match failed, the correction data in the correction data storing portion 302 is not set. In this embodiment, in the case where the pattern match failed, a process in which the correction data is not set was described as an example, but the present invention is not limited thereto. For example, even in the case where the pattern match failed, an average of the correction data (data) in the correction data storing portion 302 is set as common correction data for all the reflecting surfaces. Here, the same (common) correction data may also be predetermined correction data, not the average.

In the case where the pattern match was succeeded, the minimum difference value approaches zero without limit. Therefore, as a manner of determining a threshold T in the above-described matching condition, it is desirable that in the case where the pattern match was succeeded, a value of an error calculated from a rotation jitter or the like of the rotatable polygonal minor is set.

For example, in the case where the difference value of 4 which is the minimum difference value is the threshold T or less and the difference values of 1, 2 and 3 other than the minimum difference value of 4 are larger than the threshold T, the case is regarded as the case where the pattern match was succeeded.

On other hand, in the case where all the difference values are larger than the threshold T, the case is regarded as the case where the pattern match failed. This case can occur in the case where the BD period of a certain reflecting surface was not able to be correctly measured in the scan period storing portion of the surface discriminating signal generating portion 300 due to a cause such that noise generates in the BD signal or in the like case.

For example, in the case where the difference value of 4 is the minimum value and the pattern match was succeeded, as shown in FIG. 17, the BD period in the correction data storing portion 302 corresponding to the BD period β1 in the scan period storing portion of the surface discriminating signal generating portion 300 is the BD period α4. A change pattern of the BD periods β starting from the reflecting surface (surface ID: ID1) corresponding to the BD period β1 in part (b) of FIG. 16 and a change pattern of the BD periods α starting from the reflecting surface (D surface) corresponding to the BD period α4 in part (a) of FIG. 16 most approximate to each other. Consequently, the pattern match also identifies starting points (reflecting surfaces) of the BD periods so that the change pattern of the BD periods β and the change pattern of the BD periods α coincide with each other.

In this case, as shown in FIG. 17, for the ID1 which is the surface ID corresponding to the BD period β1, "adrs 4" is set as the reading address (adrs) in the correction data storing portion 302 of the main scan direction deviation correcting portion 301. In the positional deviation correction, the deviation correction data (data L4) stored in the reading address (adrs 4) and the correction parameters x1 and z4 are read and is used as the correction data.

Thus, when correspondence between the surface ID and the reading address adrs in the correction data storing portion 302 is determined, it is possible to read and use the deviation correction data (data) corresponding to the current reflecting surface of the rotatable polygonal mirror 4 and the correction parameters x and z, depending on each surface ID. The correspondence relationship among the BD signal, the surface ID and the correction data is shown. In the positional deviation correction, in the laser driving portion 306, emission of the laser light is controlled depending on the read deviation correction data (data) and the correction parameters x and z. That is, the CPU controls, depending on the read deviation correction data and the correction parameters x and z depending on the temperature change, the emission of the laser light from the semiconductor laser unit 1 which is the light source, through the laser storing portion 306. As a result, the positional deviation, in the main scan direction of the laser light reflected by each of the reflecting surfaces, generating due to the temperature change of the rotatable polygonal mirror can be corrected with reliability, so that it is possible to suppress a deterioration of an image quality due to the positional deviation.

Next, identification of the reflecting surface by the CPU having the functions as the surface identifying portion 303*a* and the correction data controller 303*b*, and a control process of the positional device correction of the identified reflecting surface in the main scan direction will be described. FIG. 19 is a flowchart of the process of identifying the reflecting surface and of correcting the main scan direction deviation.

First, in step S101, the CPU discriminates whether or not image formation is started, and causes the process to go to step S102 when the image formation is started. In the step S102, the CPU not only measures the BD periods β (β1 to β4) of the respective reflecting surfaces of the rotatable polygonal mirror 4 by the surface discriminating signal generating portion 300 but also controls the surface discriminating signal generating portion 300 to store the measured BD periods β in the scan period storing portion. Then, when the measurement of the BD periods β is completed for all the reflecting surfaces of the rotatable polygonal mirror 4, the CPU causes the process to go to step S104. In the step S104, the CPU reads from the scan period storing portion of the surface discriminating signal generating portion 300, the BD periods β of the reflecting surfaces of the rotatable polygonal mirror 4.

Next, in step S104 the CPU reads, from the correction data storing portion 302, the BD periods α (α1 to α4) of the reflecting surfaces of the rotatable polygonal mirror 4. Then, in step S105, the CPU calculates, from the above-read BD periods β and the above-read BD periods α of the reflecting surfaces, difference values in the respective combination patterns corresponding to the number of the reflecting surfaces of the rotatable polygonal mirror 4. For example, in the case where the rotatable polygonal minor 4 has 4 reflecting surfaces, there are four combination patterns of the BD periods, so that difference values 1 to 4 are calculated.

Next, in step S106, the CPU not only carries out the pattern match between the BD period α and the BD period β in accordance with the above-described matching condition but also discriminates whether or not the pattern match was succeeded. As a result, in the case where the pattern match was succeeded, the CPU causes the process to go to step S107.

In the step S107, the CPU identifies the combination pattern providing the minimum difference value and grasps one-to-one correspondence relationship between the BD period β and the BD period α in that combination pattern. That is, the pattern match is succeeded and the combination pattern providing the minimum difference value is identified, so that the correspondence relationship between the BD period β with which the surface ID is associated and the BD period α associated with the each rotational frequency in advance is identified, and thus the respective reflecting surfaces of the rotatable polygonal mirror 4 are identified. Then, the CPU follows the correspondence relationship as described above and sets the reading addresses (adrs) in the correction data storing portion 302 for the respective surface IDs (FIG. 17). Then, the CPU reads, from the correction data storing portion 302, the deviation correction data (data) and the correction parameters x and z, which are stored in the reading addresses (adrs) set for the surface IDs.

Further, in a step S108, the correction data storing portion 302 acquires, from the temperature detecting portion 308, the device installing space temperature of the inside portion of the apparatus in which the rotatable polygonal mirror is installed and acquires the deflector operating ratio based on the BD signal from the BD sensor 6, in advance. As described above, the deflector operating ratio is the ratio of the operating time of the deflector in the predetermined time. The deflector operating ratio is detected by counting a BD signal receiving time from the BD sensor by the correction data controller 303*b*. The deflector operating ratio is acquired for correcting the influence of the heat generated by the operation of the deflector, on the temperature of the rotatable polygonal mirror. Timing when the device installing space temperature and the deflector operating ratio are acquired may preferably be close to timing of emission of the laser light to the photosensitive drum.

Then, in step S109, the CPU calculates the temperature correction data in accordance with the above-described formula 1 by using the above-read correction parameters x and z and the above-acquired device installing space temperature and deflector operating ratio. Further, in step S110, the CPU calculates the main scan position deviation correcting value for the reflecting surfaces in accordance with the above-described formula 2 by using the above-read deviation correction data for the reflecting surfaces and the above-calculated temperature correction data depending on the temperature change of the reflecting surfaces. This calculated main scan position deviation correction data is correction data for correcting the positional deviation in the main scan direction of the laser light for the identified surface identified by the above-described matching. Then, in S111, the CPU sets the main scan position device value (correction data) for each surface ID.

Then, in subsequent step S112, the CPU controls, on the basis of the main scan position deviation correcting value set depending on the temperature change, emission of the laser light from the semiconductor laser unit 1 which is the light source, through the laser driving portion 306, and carries out the image formation. Specifically, the CPU controls the calculated main scan position deviation correcting value so as to be outputted to the laser light modulating portion (image clock generating portion) 304.

In the laser light modulating portion (image clock generating portion) 304, on the basis of the main scan position deviation correcting value, image clock modification is performed for each of scanning lines for the respective reflecting surfaces of the rotatable polygonal mirror 4, so that the main scan position deviation correction is made.

The laser light modulating portion (image clock generating portion 304 supplies, to the laser driving portion 306, image clocks modified on the basis of the main scan position deviation correcting value set depending on the temperature change. The image signal generating portion 305 generates an image signal and supplies the image signal to the laser driving portion 306. The laser driving portion 306 outputs the laser light from the semiconductor laser unit 1 in accordance with the supplied image signal and the image clocks generated by the main scan position deviation correcting portion 301, and carries out the image formation. Then, in step S113, the CPU discriminates whether or not the image formation is ended, and when the image formation is ended, the CPU ends the control process.

On the other hand, in the case where the pattern match failed in the above-described step S106, the CPU causes the process to go to step S114. In the step S114, the CPU does not set the correction data. Incidentally, in this embodiment, the control process in which the correction data is not set in the case where the pattern match failed was described as an example, but the present invention is not limited thereto. For example, even in the case where the pattern match failed, the control process may also be carried out in the following manner. That is, an average of the correction data (data) in the correction data storing portion 302 is set as common correction data to all the reflecting surfaces. Then, the same correction is made to the laser light for each of the reflecting surfaces of the rotatable polygonal mirror 4. The control process may also be carried out in such a manner.

By making the above-described main scan position deviation correction, it is possible to suppress the deterioration of the image quality due to the above-described positional deviation in the main scan direction. Further, by making the above-described positional deviation correction, a maximum deviation amount from ideal positions at the image writing start portion, the image center portion and the image writing end portion can be made not more than a predetermined value (in this embodiment, not more than about 5 µm). Further, a relative deviation amount among the reflecting surfaces of the rotatable polygonal mirror 4 can be made not more than about 3 µm.

Further, the case where the material of the rotatable polygonal minor 4 is the resin material such as the polycarbonate resin or the cycloolefin resin was described, but is not limited thereto. Even in the case where the material of the rotatable polygonal minor 4 is a metal material such as aluminum, a deformation amount of the reflecting surface due to the rotation of the rotatable polygonal minor 4 is not completely zero. For that reason, even in the case where the material of the rotatable polygonal mirror 4 is the metal material, similar main scan position deviation correcting values are acquired depending on the temperature changes, and then the main scan position deviation correction depending on the temperature change may also be carried out.

Thus, by calculating the main scan direction magnification deviation correcting value on the basis of the device installing space temperature and the deflector operating ratio, it is possible to reliably correct the main scan direction positional deviation, of the laser light reflected by each of the reflecting surfaces, generating due to the temperature change of the rotatable polygonal mirror 4. Accordingly, even when the temperature of the space in which the rotatable polygonal mirror 4 of the image forming apparatus is installed is changed, the deterioration of the image quality is not caused to occur, so that a high-quality image can be maintained.

In the above-described embodiments, the temperature detecting portion 308 was provided inside the image forming apparatus in the neighborhood of an apparatus casing being away from the control board and the fixing device 108, but an installing position thereof is not limited thereto. As shown in FIG. 21, the temperature detecting portion may also be provided inside the optical box of the optical scanning apparatus. A modified embodiment of the above-described embodiment will be described using FIGS. 21 and 22. FIG. 21 is a perspective view of an optical scanning apparatus according to the modified embodiment. FIG. 22 is a flow chart of a process of identifying the reflecting surface and of correcting the main scan magnification deviation in the modified embodiment.

Incidentally, a schematic structure of an image forming apparatus according to this modified embodiment is similar to that of the above-described embodiment, and therefore will be omitted from description. Further, a structure of the optical scanning apparatus is also similar to that of the above-described embodiment except for an arrangement of the temperature detecting portion, and therefore, members having the same functions are represented by the same reference numerals or symbols and will be omitted from description.

In this modified embodiment, as shown in FIG. 21, a deflector 5 includes a temperature detecting portion 309 in the neighborhood of a rotatable polygonal mirror 4. Specifically, the temperature detecting portion 309 is provided on a circuit board 18 (FIG. 2) constituting the deflector 5 and in the neighborhood of the rotatable polygonal mirror 4. By thus disposing the temperature detecting portion 309 inside the optical box 8, a temperature of the rotatable polygonal mirror 4 can be detected more directly, so that the main scan position deviation correction can be made with accuracy.

Similarly as in the above-described embodiment, the main scan position deviation correction data is the deviation correction data corresponding to the respective reflecting surfaces at the normal temperature, and therefore, there is a need to be corrected depending on a temperature change of a space in which the rotatable polygonal mirror 4 is installed. The correction parameters are parameters for correcting the deviation correction data corresponding to the reflecting surfaces at the normal temperature, depending on the temperature change of the space in which the rotatable polygonal mirror 4 is installed. In this modified embodiment, in order to correct the deviation correction data stored in the correction data storing portion 302 depending on the temperature change, a deflector temperature in the inside of the optical scanning apparatus in which the deflector is installed and an operating ratio of the deflector are used. Correction parameters y (y1, y2, y3, y4) are parameters for using the deflector temperature the temperature correction data. Correction parameters z (z1, z2, z3, z4) are parameters for using the deflector operating ratio as the temperature correction data. By using these correction parameters y and z, the temperature correction data for correcting the deviation correction data corresponding to the respective reflecting surfaces A to D are acquired by the following formula 3.

$$\text{Temperature correction data} = (y1, y2, y3, y4) \times (\text{deflector temperature}) + (z1, z2, z3, z4) \times (\text{deflector operating ratio}) \quad \text{[Formula 3]}$$

Incidentally, the main scan magnification deviation correcting value, corresponding to the reflecting surfaces, for correcting the positional deviation in the main scan direction of the laser light reflected by the reflecting surface of the rotatable polygonal mirror, generating due to the temperature change is acquired by the above-described formula 2.

On the basis of the correction data (data) stored in the correction data storing portion and the correction parameters y and z depending on the temperature change, emission of the laser light by the semiconductor laser unit 1 which is the light source is controlled.

Here, a control process of identifying the reflecting surface and of correcting positional deviation in the main scan position of the identified reflecting surface by the CPU having the functions as the surface identifying portion 303a and the correction data controller 303b will be described. FIG. 22 is the flowchart of the process of identifying the reflecting surface and of correcting the main scan position deviation correction.

In FIG. 22, operations of steps S201 to S206 and steps S212 to S214 are similar to the operations of the steps S101 to S106 and the steps S112 to S114 described using FIG. 19, and therefore will be omitted from description in this modified embodiment.

In the step S207, the CPU identifies a combination pattern providing a minimum difference value, and grasps a one-to-one correspondence relationship between the BD period β and the BD period α in the combination pattern. That is, the pattern match is succeeded and the combination pattern providing the minimum difference value is identified, so that a correspondence relationship between the BD period β with which the surface ID is associated and the BD period α associated with the reflecting surfaces in advance is identified, and the respective reflecting surfaces of the rotatable polygonal mirror 4 are identified. Further, the CPU follows the correspondence relationship as described above and sets reading addresses (adrs) in the correction data storing portion 302 for the respective surface IDs. Then, the CPU reads, from the correction data storing portion 302, the deviation correction data (data) stored in the reading addresses (adrs) set for the surface IDs and reads the correction parameters y and z.

Then, in the step S208, the correction data controller 303b acquires, from the temperature detecting portion 309, the deflector temperature of the inside of the optical scanning apparatus in which the rotatable polygonal mirror is installed, and acquires the deflector controller based on the BD signal from the BD sensor 6. Timing of acquiring the deflector temperature and the deflector operating ratio may preferably be close to timing of emitting the laser light to the photosensitive drum.

Then, in the step S209, the CPU calculates the temperature correction data in accordance with the above-described formula 3 by using the above-read correction parameters y and z and the above-acquired deflector temperature and deflector operating ratio. Then, in the step S210, the CPU calculates the main scan position deviation correcting value for the reflecting surfaces in accordance with the above-described formula 2 by using the above-read deviation correction data for the reflecting surfaces and the above-calculated temperature correction data depending on the temperature change for the reflecting surfaces. This calculated main scan position deviation correcting value is correction data for correcting the positional deviation in the main scan direction of the laser light for the identified surface identified by the above-described matching. Then, in the step S211, the CPU sets main scan position deviation correcting values (correction data) for the respective surface IDs.

On the basis of the thus-set correspond, emission of the laser light by the semiconductor laser unit 1 which is the light source is controlled.

Incidentally, in this modified embodiment, a constitution in which the deflector 5 supports the temperature detecting portion 309 was described as an example, but the temperature detecting portion 309 may also be supported by another member if there is no obstacle between itself and the deflector 5 and the temperature detecting portion 309 is installed in the neighborhood of the rotatable polygonal mirror 4. For example, the temperature detecting portion 309 may also be supported by the optical box 8.

Thus, by calculating the main scan position deviation correcting value depending on the temperature detecting portion 309 disposed in the neighborhood of the rotatable polygonal mirror 4, the positional deviation in the main scan direction of the laser light reflected by the reflecting surfaces, generating due to the temperature change can be reliably corrected. Accordingly, even when the deflector temperature and the deflector operating ratio are changed, a deterioration of the image quality due to the positional deviation is reduced, so that a high-quality image can be maintained.

Incidentally, in the above-described embodiments, as the image forming apparatus, the printer was described as an example, but the present invention is not limited thereto. For example, the image forming apparatus may also be other image forming apparatuses such as a copying machine, a facsimile machine and a multi-function machine having functions of these machines in combination. By applying the present invention to the above-described image forming apparatuses, similar effects can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2018-197220 filed on Oct. 19, 2018 and 2018-197221 filed on Oct. 19, 2018, which are hereby incorporated by reference herein in their entirety.

What is claimed is:

1. An image forming apparatus comprising:
a photosensitive member;
a scanning unit configured to scan said photosensitive member with laser light depending on image information, wherein said scanning unit includes a light source configured to emit the laser light depending on the image information, a rotatable polygonal mirror which is configured to deflect the laser light emitted from said light source and which is made of a resin material, and a sensor configured to receive the laser light reflected by said rotatable polygonal mirror;
a surface identifying portion configured to identify of a plurality of reflecting surfaces of said rotatable polygonal mirror on the basis of a signal outputted from said sensor;
a storing portion configured to store deviation correction data for correcting deviation in a main scan direction of the laser light at a predetermined temperature, and to store a temperature correction parameter used for correcting the deviation correction data depending on a temperature which is associated with the plurality of reflecting surfaces, the temperature correction parameter being stored with different values depending on the reflecting surfaces;
a circuit substrate configured to drive said rotatable polygonal mirror;
a temperature detecting portion configured to detect a temperature of an inside of said image forming apparatus, wherein said temperature detecting portion is provided on said circuit substrate; and
a correction data controller configured to correct the deviation correction data, stored in the storing portion, corresponding to each of the reflecting surfaces on the basis of the temperature correction parameter corresponding to each of the reflecting surfaces and the temperature detected by said temperature detecting portion,
wherein positional deviation in the main scan direction of the laser light is corrected on the basis of the deviation correction data corrected by said correction data controller.

2. An image forming apparatus according to claim 1, wherein said temperature detecting portion is provided inside said scanning unit and detects a temperature of an inside of said scanning unit.

3. An image forming apparatus according to claim 1, wherein the deviation correction data stored in said storing portion is correction data for correcting deviation in the main scan direction of the laser light reflected by each of the reflecting surfaces of said rotatable polygonal mirror at a normal temperature.

4. An image forming apparatus according to claim 1, wherein said sensor outputs a signal for establishing synchronization of an image writing start position with respect to the main scan direction at each of the reflecting surfaces of said rotatable polygonal mirror.

* * * * *